US012756121B2

United States Patent
(12) United States Patent
Heebong et al.

(10) Patent No.: US 12,756,121 B2
(45) Date of Patent: Oct. 6, 2026

(54) CONNECTION PIN WITH A HIGH ASPECT RATIO FOR SEMICONDUCTOR CONNECTIONS

(71) Applicant: DUKSAN HI METAL CO., LTD., Ulsan (KR)

(72) Inventors: Oh Heebong, Ulsan (KR); Park Soon-Ho, Ulsan (KR); Eun Dong Jin, Ulsan (KR); Lee Jae-Ki, Ulsan (KR); Lee Tae-Hyun, Ulsan (KR); Kim Kyung Tae, Ulsan (KR); Park Eun Kwang, Ulsan (KR); Kim Jin-Gyu, Ulsan (KR)

(73) Assignee: DUKSAN HI METAL CO., LTD., Ulsan (KR)

( * ) Notice: Subject to any disclaimer, the term of this patent is extended or adjusted under 35 U.S.C. 154(b) by 355 days.

(21) Appl. No.: 18/531,828

(22) Filed: Dec. 7, 2023

(65) Prior Publication Data

US 2025/0062559 A1 Feb. 20, 2025

(30) Foreign Application Priority Data

Aug. 18, 2023 (KR) ........................ 10-2023-0108044

(51) Int. Cl.
*H01R 13/03* (2006.01)

(52) U.S. Cl.
CPC .................................... *H01R 13/03* (2013.01)

(58) Field of Classification Search
CPC ...................................................... H01R 13/03
See application file for complete search history.

(56) References Cited

U.S. PATENT DOCUMENTS

| | | | | |
|---|---|---|---|---|
| 6,394,821 B1 * | 5/2002 | Matsumura | H01R 12/52 | 439/91 |
| 6,415,504 B1 * | 7/2002 | Matsuda | H05K 3/225 | 29/850 |
| 8,142,240 B2 * | 3/2012 | Oh | H05K 3/3426 | 439/876 |
| 8,315,063 B2 * | 11/2012 | Hsu | H05K 1/111 | 361/767 |
| 2007/0295528 A1 * | 12/2007 | Nishi | C22C 13/00 | 174/126.4 |

FOREIGN PATENT DOCUMENTS

| | | | | |
|---|---|---|---|---|
| CN | 110199054 A * | 9/2019 | C23C 30/00 | |
| DE | 3712691 C1 * | 6/1988 | C25D 5/12 | |
| EP | 1535730 B1 * | 3/2010 | H10W 70/24 | |

* cited by examiner

*Primary Examiner* — Abdullah A Riyami
*Assistant Examiner* — Thang H Nguyen
(74) *Attorney, Agent, or Firm* — Blueshift IP; Robert Plotkin

(57) ABSTRACT

In one aspect of the present invention, the connection pin comprises a columnar structure with a diameter ranging from 60 to 500 micrometers (μm) and an aspect ratio (length to diameter) ranging from 1 to 10. Furthermore, the angle formed between the horizontal and vertical surfaces of the said structure is characterized by being between 90°±3°.

10 Claims, 17 Drawing Sheets

(a) (b)

(a) (b) (c) (d) (e)

(f) (g) (h) (i) (j)

Example 3

Volume Statistics (Arithmetic) 230410_2314US01_01.$av

Calculations from 0.017 um to 2000 um

| | | | |
|---|---|---|---|
| Volume: | 100% | | |
| Mean: | 3.227 um | S.D.: | 1.431 um |
| Median: | 3.203 um | C.V.: | 44.4% |
| Mode: | 3.687 um | | |

$d_{10}$: 1.516 um $d_{50}$: 3.203 um $d_{90}$: 5.085 um

| <10% | <25% | <50% | <75% | <90% |
|---|---|---|---|---|
| 1.516 um | 2.309 um | 3.203 um | 4.195 um | 5.085 um |

| <1 um | <2 um | <2.5 um | <3.5 um | <5 um | <7 um | <10 um |
|---|---|---|---|---|---|---|
| 6.99% | 17.8% | 30.0% | 58.2% | 88.8% | 99.7% | 100% |

Comparative Example 3

Volume Statistics (Arithmetic) 220628_2226ET01_01.$av

Calculations from 0.017 um to 2000 um

| | | | |
|---|---|---|---|
| Volume: | 100% | | |
| Mean: | 6.322 um | S.D.: | 2.164 um |
| Median: | 6.052 um | C.V.: | 34.2% |
| Mode: | 6.452 um | | |

$d_{10}$: 3.686 um $d_{50}$: 6.052 um $d_{90}$: 9.414 um

| <10% | <25% | <50% | <75% | <90% |
|---|---|---|---|---|
| 3.686 um | 4.639 um | 6.052 um | 7.780 um | 9.414 um |

| <2 um | <2.6 um | <5 um | <10 um | <11 um | <15 um | <20 um |
|---|---|---|---|---|---|---|
| 0.0013% | 0.75% | 31.4% | 93.5% | 97.3% | 99.998% | 100% |

| | |
|---|---|
| Example 3 |  |
| Comparative Example 3 |  |

CONNECTION PIN WITH A HIGH ASPECT RATIO FOR SEMICONDUCTOR CONNECTIONS

BACKGROUND OF THE INVENTION

With the decreasing pitch spacing of electrode in conventional semiconductor mounting, there's a demand for the development of connection materials with a new concept. In this regard, research is being conducted on stable connections using pin-shaped connection materials such as metal pin or conductive solder pins plated with a solder layer.

When using metal pin or solder pins, they can be utilized without the risk of bridging even with narrower pitch spacings. Furthermore, since the metal pin or solder pins are made of metals with high thermal conductivity, they also exhibit a heat dissipation effect, releasing the heat generated in the semiconductor to the substrate.

Meanwhile, a method to form a copper pillar for the vertical connection between the Bottom die and the Top die in some Package on Package (PoP) stacked package structures is known. However, the pillar formation method involves internal layering using plating, and there has been no detailed research on externally produced metal pin and their manufacturing methods, conductive solder pins plated with a solder layer and their manufacturing methods, the transfer methods of connection pins, or the connection methods of connection pins. Thus, there's an urgent need for development in these areas.

Additionally, specialized paste composition development with high connection stability is necessary to use connection pin with a high aspect ratio for semiconductor connections.

FIELD OF THE INVENTION

The present invention pertains to solder paste for a connection pin, more specifically, it is about the solder paste used for attaching an electrically conductive metal pin intended for electrical connection to an electrode or substrate.

The present invention pertains to a connection pin, more specifically, it is about an electrically conductive metal pin intended for electrical connections or a connection pin equipped with a solder layer.

The present invention pertains to a semiconductor package, more specifically, it is about a semiconductor package that includes connection pin with a high aspect ratio.

DESCRIPTION OF THE RELATED ART (Patent Document 1) Korean Publication No. 10-2007-0101157.

SUMMARY OF THE INVENTION

One aspect of the present invention aims to provide solder paste for connection pin that offers excellent connection reliability when connecting pins to semiconductors and other components.

Another aspect of the present invention aims to provide connection pin with superior electrical and thermal conductivity and excellent connection reliability even at high aspect ratios.

Yet another aspect of the present invention aims to provide a new structure of a semiconductor package that has connection pin ensuring excellent connection reliability.

According to the present invention, the technical means applied to the connection pin, as set forth in the claims, are summarized as follows:

A connection pin according to the present invention comprises a columnar structure with a diameter ranging from 60 to 500 micrometers (μm) and an aspect ratio (length to diameter) of 1 to 10. The angle formed between the horizontal and vertical surfaces of this structure lies between 90°±3°.

The connection pin according to the present invention is made of metal or an alloy and includes a metal pin with an electrical conductivity ranging from 11% to 101% IACS.

The aforementioned metal pin has a melting point ranging from 500 to 1000° C.

The edge R value of the aforementioned metal pin lies between 3 to 20 μm.

The surface roughness of the connection pin according to the present invention is RMS 0.5 to 1 μm.

The connection pin according to the present invention further comprises a solder layer on at least one region of the metal pin's surface, which includes tin.

The solder layer contains silver, with the silver (Ag) content ranging from 1.5 to 4.0 weight %.

The thickness of the aforementioned solder layer is 0.1 to 10 μm.

The solder layer is plated onto the exterior surface of the metal pin.

The exterior of the solder layer additionally includes a diffusion layer introduced to prevent the formation of intermetallic compounds by the diffusion of metal alloy atoms in the metal pin with tin or other metal atoms in the solder layer.

The thickness of the aforementioned diffusion layer ranges from 1 to 5 μm."

According to one aspect of the present invention, the solder paste for connection pins can address the corrosion and hardening issues of the solder paste that occur during the pin mounting process and provides superior soldering quality due to its appropriate composition. Therefore, this invention can significantly reduce the defect rate in the semiconductor connection process and can enhance the electrical reliability of the product. Moreover, it improves the productivity in semiconductor manufacturing, reduces costs, and ensures stability and accuracy of the manufacturing process.

In another aspect of this invention, the connection pin exhibits excellent electrical and thermal conductivity and maintains superior connection reliability even at high aspect ratios. Furthermore, compared to conventional connection materials, the volume of the solder layer decreases, leading to higher thermal conductivity of the connection pin. As a result, this facilitates the dissipation of generated heat towards the substrate.

Additionally, the semiconductor package according to this invention has the effect of improved electrical reliability of the product, even when the connecting material is furnished in a small area. It does not suffer from issues like tilt, missing, shear strength reduction, or incomplete melting, and thus reduces the defect rate.

DETAILED DESCRIPTION OF THE PREFERRED EMBODIMENTS

Figure 1:
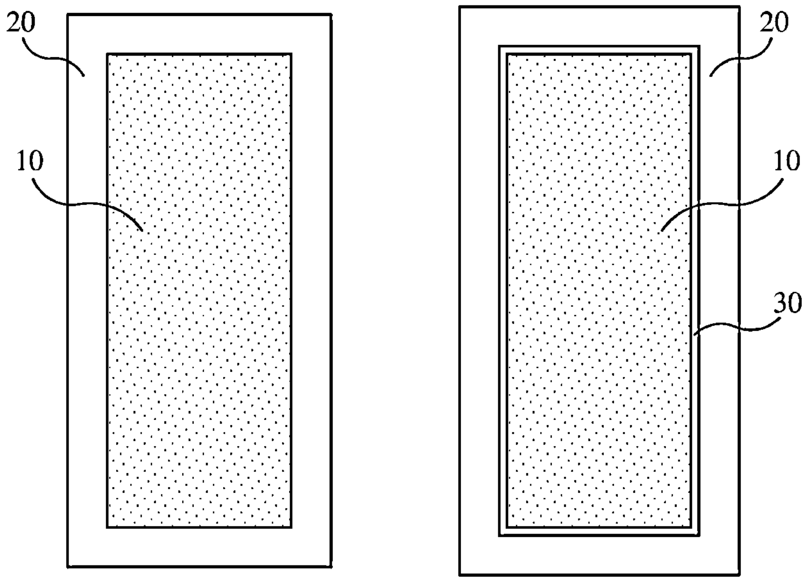
FIG. 1 is a cross-sectional view of the solder pin.

The inventive concept described below (present inventive concept) is capable of various modifications and can have several embodiments. Specific embodiments are exemplified in the drawings and are described in detail. However, it should be understood that this is not intended to limit the inventive concept to any specific embodiment. Rather, it is intended to encompass all modifications, equivalents, or substitutes that fall within the technical scope of the inventive concept.

The terms used below are used only to describe specific embodiments and are not intended to limit the inventive concept. Unless the context clearly indicates otherwise, singular expressions include plural expressions. In the following, terms like “includes” or “has” are intended to indicate the presence of features, numbers, steps, actions, components, parts, ingredients, or materials listed in the specification, and should not be understood to preclude the presence or addition of one or more other features, numbers, steps, actions, components, parts, ingredients, materials, or combinations thereof.

In the drawings, the thickness has been exaggerated or reduced to clearly depict various layers and regions. Throughout the specification, the same reference numbers are attached to similar parts. Throughout the specification, when one part, such as a layer, film, region, or plate, is said to be “on” or “above” another part, it includes not only being directly on top of the other part but also having another part in between. Throughout the specification, terms like “first,” “second,” etc., can be used to describe various components, but the components should not be limited by these terms. These terms are used solely to distinguish one component from another.

Although terms like “first,” “second,” etc., can be used to describe various elements, ingredients, regions, layers, and/or areas, it should be understood that these elements, ingredients, regions, layers, and/or areas should not be limited by these terms.

Furthermore, the processes described in this invention do not necessarily imply they have to be applied in order. For instance, if a first step and a second step are mentioned, it doesn’t necessarily mean the first step has to be performed before the second.

In this specification, the term “metal” can be used in a broad sense to mean not only metal elements but also alloys typically referred to as metals.

In this specification, a “metal pin” refers to a columnar connection material that doesn’t have a separate solder layer on its exterior.

In this specification, a solder pin refers to a pin meant for connecting with an electrode or substrate and has a separate solder layer on the exterior of the metal pin. In this case, the solder layer flows during reflow, allowing both ends of the metal pin to be attached.

In this specification, a “connection pin” encompasses the previously mentioned metal pin and solder pin, and is used in the context of an electrical connecting pin in a semiconductor package.

First Aspect: Solder Paste for Connection Pin

According to this aspect, the solder paste for solder pins can be used in a semiconductor package, especially for connecting both ends of a metal pin to an electrode or substrate provided in the semiconductor package or for forming a solder layer on the exterior of the metal pin.

The solder paste according to this embodiment contains solder powder and flux.

The solder powder is a powder containing tin components, which essentially melts to become an electrically connectable medium. The solder powder is a primary ingredient required to make solder paste, mainly created from metal alloys. In this aspect, it is composed of lead-free low-melting-point metal.

The particle size and shape of the solder powder, as well as the alloy composition, have a significant impact on the quality and performance of the solder paste. Particle size is crucial as it determines the melting rate and adhesion during the soldering process. Therefore, in this invention, the solder powder used has a median diameter (mean) of 3 to 5 μm.

If the median diameter of the solder powder is less than 3 μm, the overall fines content increases, leading to a rise in the viscosity of the solder paste, which subsequently reduces its workability. If it’s more than 5 μm, the thixotropy of the solder paste decreases, causing the shape to collapse during printing.

Additionally, in the solder paste, the solder powder with a diameter of less than 1 μm should be less than 10 weight %, and more desirably between 3 weight % and 10 weight %. If there is less than 3 weight % of the solder powder, the viscosity of the solder paste might increase, potentially leading to printing defects. If the fines smaller than 1 μm are more than 10 weight %, the increased specific surface area of the solder powder might not allow for sufficient removal of the oxide layer, which can result in incomplete melting during the reflow process.

Furthermore, in the solder paste, the solder powder with a diameter of 8 μm or more should be less than 1 weight %. If the coarse particles larger than 8 μm exceed 1 weight %, it can cause tilt defects when mounting Cu pin.

The solder powder necessarily contains tin and should include elements selected from a group consisting of silver and copper, with a melting point desirably between 217° C. and 220° C.

Specifically, Sn—Ag—Cu, such as Sn96.5Ag3.0Cu0.5, can be used.

Additionally, to prevent incomplete melting and tilting, the C.V. value of the solder powder should desirably be around 30-40%. If it exceeds 40%, the excessive difference between the coarse and fine particles can lead to tilting defects. Especially when there's a higher proportion of coarse particles, issues like print omission and clogging of the printing mask can arise.

At this time, the oxygen concentration of the utilized solder powder should desirably be less than 800 ppm. If the oxygen concentration exceeds 800 ppm, incomplete melting can occur due to oxidation on the surface of the solder powder, leading to reduced bonding characteristics and potential reliability issues.

Flux is essential during the soldering process. As the solder powder melts, the flux also melts, reacting with the oxygen in the air where the solder and component are exposed. This prevents oxidation, ensuring a clean and stable electrical connection between the solder and the component. Furthermore, flux cleans the surface of the component, removing impurities, oils, and other contaminants, enhancing the solder's 'wettability' to ensure it adheres well to the component's surface.

The optimal content of flux is between 10 to 20% by weight. If the Flux content is below 10%, the solder powder might not melt adequately. After placing the solder pin and during the reflow process, the insufficiently melted solder powder can act as a contaminant. This can cause a tilt in the solder pin, leading to unstable electrical connections.

Conversely, if the flux content exceeds 20%, there might be unreacted flux left after the solder paste has melted. This can result in void and a significant reduction in viscosity, leading to decreased printability. The adhesive properties of the solder paste can also be compromised, making it easier for the metal pin to detach, increasing the risk of missing defects.

At this point, flux comprises surfactant, active agent, additive, and solvent. Optionally, a defluxing agent can be included as an additive. It's advisable to use a water-soluble flux, which provides high yields and a clean surface.

Surfactants are compounds that contain both hydrophilic groups, which dissolve well in water, and hydrophobic groups, which dissolve in oil. They can be completely removed by water during the cleaning process after reflow. To promote solder surface spreading and improve adhesion, surfactants can contain one or more compounds selected from a group consisting of Propylene Glycol Ether, Ethylene Glycol Ether, Diethylene Glycol Ether, Triethylene Glycol Ether, and Glycol Ether Acetates.

In particular, Propylene Glycol Ether possesses a low surface tension. As a result, the solder paste can spread well on the object's surface, and the drying time can be adjusted. This enhances the quality of the solder joint.

The active agent works to remove the oxidation layer on the copper pin, solder powder, and the pad surface. It ensures that the solder has improved wettability, allowing it to adhere better to electrode and other elements. Additionally, it prevents re-oxidation at high temperatures, thereby protecting the surface.

In this invention, the active agent includes the first active agent, the second active agent, and the third active agent.

The first active agent is primarily an organic acid used to remove the oxidation film on the Pad and Cu pin. Organic carboxylic acids are preferably employed. For instance, one or more compounds selected from a group consisting of succinic acid, glutaric acid, lauric acid, sebacic acid, adipic acid, suberic acid, and maleic acid can be included.

The content of the first active agent is preferably between 2 to 7 weight % of the total flux content.

If the content of the organic acid is below this range, the oxidation film might not be adequately removed, leading to incomplete melting. This can subsequently result in tilt and missing defects. If the organic acid exceeds this range, a reaction can occur within the solder paste before the reflow process. This reaction between the metal within the solder paste and the organic acid forms metal salts, potentially causing the solder paste to harden and corrode.

Furthermore, to provide stronger activity, the active agent may also include a second active agent which is a halogen compound. Compounds from chlorine, fluorine, iodine, and bromine families can be utilized.

For chlorine compounds, chloroacetate, chloropyridine, and chloropropylate can be used. Fluorine compounds might include fluorinated amine, fluorinated ethylene, and fluorinated ammonium. As for iodine compounds, 2-iodobenzoic acid, 3,5-diiodosalicylic acid can be selected. Bromine compounds might encompass cetyltrimethylammonium bromide and trans-2,3-dibromo-2-butene-1,4-diol.

In embodiments of this invention, bromine compounds were utilized. These bromine compounds possess high activity and a lower evaporation temperature, enabling the paste to evaporate more efficiently during assembly, filling the gaps between components, and facilitating superior soldering.

The third active agent is an amine-based active agent, and at least one from a group consisting of triethanolamine, diethanolamine, tetrakisethylenediamine, and polyoxyethylene tallow amine can be selected. The amine-based active agent can better spread over the adherend's surface, even at narrow contact points, ensuring that the flux adheres well to the connection pin surface.

The solvent enhances the interface between the solder and the connection pin. It can include one or more compounds selected from a group consisting of Terpineol, Menthol, Dipentene, and Limonene.

For the flux, per 100 weight parts of solvent, it is preferable to include surfactant at 110 to 150 weight parts, active agent at 10 to 20 weight parts, amine-based active agent at 120 to 150 weight parts, and additive at 2 to 10 weight parts.

If the surfactant exceeds the aforementioned range, excessive bubbles can form within the flux, leading to defects in paste printing. Furthermore, an excessive reduction in surface tension can cause the flux to spread in undesired areas.

If the surfactant is below the specified range, residues might be present after the reflow process in the cleaning stage, and the flux might not spread on the adherend's surface as desired.

When the active agent surpasses the aforementioned range, unwanted chemical reactions may occur, or the stability and longevity of the flux could decrease. If it is below the specified range, the necessary chemical reactions might not sufficiently take place, potentially reducing adhesion or soldering quality.

If the amine-based active agent exceeds the defined range, it could disrupt the pH balance of the flux, potentially causing undesired corrosive reactions or diminishing the stability of the flux.

If the amine-based active agent is below the specified range, the wetting, dispersion, and antioxidation characteristics of the flux could weaken, leading to an overall decrease in performance.

Should the additive surpass the aforementioned range, the chemical stability of the flux might diminish, or certain functionalities might become excessively enhanced, leading to imbalances that negatively impact other vital properties. If the additive is below this range, specific functionalities or characteristics of the flux might not be fully realized, resulting in a decrease in the flux's overall performance.

De-fluxing involves removing residual flux after the soldering process. After soldering, any remaining flux on components or circuits can lead to corrosion, changes in electrical properties, thermal issues, and surface contamination. Therefore, it's advisable to include a defluxing agent that aids in surface reactivation and offers antioxidation and anti-corrosion effects.

Hence, for the deflux agent, one can use modified glycol ethers such as Ethylene Glycol, Propylene Glycol, Diethylene Glycol, Triethylene Glycol, Polyethylene Glycol, Butyl Carbitol, Hexyl Carbitol, and Diethylene Glycol Diethyl Ether.

Aspect 2: Connection Pin

The second aspect of this invention pertains to the connection pin. The connection pin includes the metal pin and a solder pin with a solder layer formed on the exterior of the metal pin.

In this invention, the metal pin is a pillar-shaped metal pin that's produced by cutting a metal wire to a predetermined diameter and height. In an embodiment of this invention, the metal pin serves the purpose of electrically connecting a substrate to another substrate, or a pad or electrode on a semiconductor chip. It's desirable for this connecting metal pin to have an electrical conductivity ranging from 11 to 101% IACS, indicative of high electrical conductance.

To achieve the aforementioned electrical conductivity, the connecting metal pin comprises at least one metal selected from a group consisting of Cu, Ag, Au, Pt, and Pd as its primary ingredient.

Furthermore, in this embodiment, when the connecting metal pin is used as a connecting material, it's favorable for its thermal conductivity to be between 50 to 450 W/mK, more desirably between 320 to 450 W/mK. This is because, in such cases, the connecting material can effectively transfer heat towards the substrate, offering a cooling effect.

Additionally, in this embodiment, it is desirable for the metal pin to have a Vickers hardness ranging from 160 to 300 HV. If it exceeds this range, problems such as difficulty in cutting during pin fabrication, breaking, or bending might occur. If it's below this range, issues related to burrs on the cut surface can arise.

The diameter of the metal pin ranges from 60 to 500 μm, more desirably from 50 to 300 μm, and its height ranges from 60 to 3,000 μm, more desirably from 60 to 1,000 μm.

The aforementioned diameter and height are selected considering mechanical stability, adhesive strength, manufacturing process, and thermal management. If they fall below the stated ranges, the resistance in electrical connection can increase, potentially restricting the flow of electrical signals. This can consequently lead to a decline in electrical performance. Additionally, the structural strength might decrease, failing to provide sufficient mechanical strength and maintaining reliability against external shocks or vibrations.

Moreover, metal pin with a smaller diameter can limit heat dispersion. The heat generated in semiconductor devices needs to be adequately dispersed. If the diameter of the metal pin is too small, the heat might not disperse sufficiently, leading to overheating issues in the semiconductor. A smaller diameter also complicates precise assembly and manufacturing.

On the other hand, if the diameter of the metal pin exceeds the aforementioned range, it can occupy limited space within the semiconductor chip, causing spatial constraints in chip design. This can lead to collisions or interferences with other components or contact points. Also, the distribution of the electric current that is applied can be restricted, potentially causing temperature rises or electrical issues.

The aspect ratio (length/diameter) of the metal pin is desirably between 1 and 10. Particularly in this invention, when manufacturing by cutting metal wire, metal pin with an aspect ratio of 3 to 5 can be produced, suitable for applications such as multi-chip packages with narrow pitch and a significant height between substrate.

The aspect ratio is a factor related to mechanical stability, adhesive strength, manufacturing process, and thermal dispersion. From a mechanical stability perspective, if the aspect ratio falls below the stated range, the structural strength might not be sufficient, and it may become more sensitive to external shocks or vibrations. If the aspect ratio exceeds the given range, geometrical stability might decrease, leading to issues like bending or deformation.

From an adhesive strength perspective, if the aspect ratio is smaller than the specified range, it might not provide a sufficient adhesive surface area. Conversely, a larger aspect ratio might reduce the adhesive force, compromising the reliability of the components.

From a manufacturing process perspective, a smaller aspect ratio than the specified range demands precise control and assembly, while a larger aspect ratio might complicate efficient control during the manufacturing process.

From a thermal management perspective, if the aspect ratio is too small, there might not be enough heat dispersion. If it's too large, the limitation in the heat transfer path might lead to thermal issues.

When intending to use a metal pin made by cutting a copper wire for a semiconductor package, erecting the pin with its diameter surface as the base poses a significant technical challenge. If not properly erected, the metal pin might tilt, get omitted, become difficult to attach, and face deformation issues during the attachment process.

Therefore, it is desirable for the metal pin to have angles between all its horizontal and vertical planes within a range of 90±3° when erected on its base.

If this range is exceeded, the metal pin can become sensitive to external shocks or vibrations, develop a tilt, have a higher omission rate, and precise positioning with other components might become challenging. Furthermore, during the attachment process, the shape of the metal pin might get deformed.

Furthermore, the edge R value of the metal pin is desirably between 3 and 20 μm, and more preferably within a range of 5 to 10 μm. The term "edge R" refers to "edge radius" or "edge rounding," indicating the degree to which the corner is rounded. If the value exceeds the aforementioned range, the connection surface of the metal pin becomes rounded, leading to tilt when mounted on a component. If the value is below the mentioned range, the edges of the metal pin become sharp and angular. In such a state, the fillet may not form adequately on the bottom of the metal pin, potentially causing the solder paste not to adhere sufficiently to the surface of the metal pin.

For achieving the above-mentioned edge R value, a soft etching method using an oxidizing agent can be utilized. Nitric Acid of concentrations between 5% and 30% or Sulfuric Acid of concentrations between 5% and 30% can serve as oxidizing agents. The treatment duration varies from a few seconds to minutes depending on the diameter and length of the metal pin. When using Sulfuric Acid, the treatment time is about ⅔ of that using a Nitric Acid solution.

The tensile strength of the metal pin is desirably between 170 and 950 Mpa. Exceeding this range might cause supply defects in the metal raw material, while falling below could lead the metal pin to deform during manufacturing.

The Vickers hardness of the metal pin embodying this example should ideally be 150 HV or higher. Preferably, it can range between 150 and 300 HV, with a more desirable range being between 160 and 220 HV. To achieve this hardness, a thermal treatment, as will be described later, is recommended.

The typical manufacturing process for the metal wire used for producing the metal pin of this invention involves first melting the metal, supplying it to a continuous casting device, and solidifying it there to form a strand. This metal strand is then shaped (depending on the application, this might involve rolling, pressing, or drawing), resulting in a metal wire of a specified diameter.

Generally, since high electrical conductivity is desired for the metal wire, high-purity molten copper with as few additive elements as possible is used.

To reduce the additive element content in molten copper, a method involves setting an appropriate oxygen content in the molten copper and solidifying the included additive elements. The oxide of the additive elements formed in this manner can float as slag on the surface of the molten copper, allowing for its removal.

However, copper wire manufactured from high-purity molten copper sees an increase in material purity, which leads to the growth of crystallites. Consequently, when the copper wire is cut, a problem arises where burrs form at the cut surface. A burr can be defined as the incomplete finish where some copper remains in the direction of the cut when the wire is cut with tools like a knife.

In other words, in the example of this invention, when the metal pin is created by cutting the metal wire, burrs inevitably form on the cut surface. At this time, it is preferable for the length of the burr to be 0.1 μm to 0.5 μm or less.

If the burr on the metal pin is larger than a certain size when the metal wire is cut, it becomes difficult to plate the solder layer, and it becomes non-functional as a connection pin in a semiconductor package that needs to stand upright. Therefore, by using a metal pin with the aforementioned range of burrs, one can manufacture a metal pin that has excellent plating adhesion, and due to the uniformity and minimization of plating thickness, tilting is prevented.

An example of a metal pin can be a copper alloy pin. A copper alloy pin is a column-shaped structural body made by cutting a copper alloy wire, primarily composed of copper, and contains copper and at least one additive element.

Pure copper pins with a purity of 99.9 or higher have an electrical conductivity of 99 to 101% IACS, which is very high. However, when making a copper pin solely from pure copper, its high ductility causes burrs to form on the cut surface. To address this, additive elements are introduced.

That is, by including a prescribed amount of additive elements in the copper, it becomes possible to reduce the size of the crystal grains regarding mechanical properties when the molten copper solidifies. Therefore, copper alloy wire produced with these additive elements can enhance the material's strength and hardness, resulting in a harder surface that minimizes burr formation on the cut surface.

Additive elements preferably include at least one selected from the group consisting of Sn, Fe, Zn, Mn, Ni, and P. It is preferable to contain them in the range of 0.1 wt % to 20 wt %, and more preferably between 5 and 10 wt %. If below the mentioned range, excessive burrs may form on the cut surface. If it exceeds the range, a decrease in electrical conductivity becomes a concern.

More preferably, the additive element can include Sn in about 0.05 to 20 wt % (more preferably 2 to 10 wt %) and can be added by mixing Sn and Zn in a ratio of 1:1 to 100:1 (preferably 1:1 to 10:1). Sn has the effect of increasing strength and hardness, and Zn has the effect of enhancing corrosion resistance and wear resistance. When combined within the aforementioned range, they can minimize the occurrence of burr. Additionally, for improved corrosion resistance and reliability, the additive elements can optionally include P from 0.01 to 1 wt % and Pt or Pd from 0.01 to 10 wt %.

Meanwhile, if only the metal pin without the aforementioned solder layer is used, the mentioned solder paste must be provided on the connection surface for connection to be possible.

FIG. 1 illustrates a solder pin with a formed solder layer. The solder pin further includes a solder layer on the exterior of the aforementioned metal pin. The solder layer is provided in at least one area on the exterior of the metal pin. Upon melting, the solder layer connects the top of the solder pin to the substrate or chip below and can form a solder joint. Furthermore, a diffusion layer (30) can be included between the metal pin and the solder layer, as described later.

Since the solder layer (20) is plated onto the metal pin, the metal pin should have good plating characteristics. Additionally, since the solder pin has a smaller contact area with the substrate compared to traditional solder balls, during the reflow process where the solder layer is attached to the substrate, there can be a significant occurrence of "missing" where the solder pin doesn't attach to the electrode or substrate, leading to a substantial reduction in workability. Therefore, the solder pin requires enhanced reliability that satisfies both the thermal shock performance and accelerated shock performance of the solder joint.

On the other hand, the solder layer according to an embodiment of the present invention is primarily composed of tin (Sn) due to regulations resulting from environmental pollution, which prohibit the use of lead (Pb). Tin (Sn) has the advantages of having physical properties similar to lead, as well as superior electroplating, ductility, corrosion resistance, and castability.

However, to meet the required properties of the solder layer, such as plating properties, drop strength, thermal cycling (TC) characteristics, and wettability, it is preferable to use an alloy with other metals rather than forming the solder layer solely with tin.

In this regard, the solder layer of this invention desirably uses a Sn—Ag—Cu alloy, alloying tin (Sn) with silver (Ag) and copper (Cu) for higher electrical and thermal conductivity. Before reflow, it adheres well to the copper alloy pin and ensures connection reliability after reflow when it includes silver (Ag), copper (Cu), the balance of tin, and any inevitable impurities.

More specifically, a solder alloy consisting of 1.5 to 4.0 weight % silver (Ag), 0.2 to 2.0 weight % copper (Cu), the balance of tin (Sn), and any inevitable impurities is provided. When this is used to manufacture solder pins, it offers excellent drop strength, thermal cycling (TC) characteristics, and wettability with a low missing rate.

Examining each component of the solder layer, silver (Ag) is non-toxic by itself. It strengthens the melting point of the alloy, improves the spreadability of the joined materials, reduces electrical resistance, and enhances the thermal cycling (TC) characteristics and corrosion resistance.

The silver (Ag) content in the solder layer is desirably between 1.5 to 4.0 weight %. If silver (Ag) is included at less than 1.5 weight %, it becomes difficult to secure sufficient electrical and thermal conductivity of the solder layer, and its wettability decreases. If it's included at more than 4.0 weight %, Bulky IMC of $Ag_3Sn$ forms within the solder alloy and solder layer, and the excessive growth of Bulky IMC can impair the impact characteristics of the solder. Preferably, it is between 2.2 to 3.2 weight %, and more preferably, it is 3.0 weight %.

Copper (Cu) can affect joint strength or tensile strength, thus improving drop impact characteristics. The copper (Cu) content in the solder layer is between 0.2 to 2.0 weight %. If copper (Cu) is included at less than 0.2 weight %, it becomes difficult to enhance the joint strength or tensile strength of the solder layer as desired. If it's included at more than 2.0 weight %, the solder can harden, easily causing structural damage and decreasing workability. Preferably, it's between 0.2 to 1.0 weight %, and more preferably, it is 0.5 weight %.

Optionally, zinc can be further included. When zinc (Zn) is included in a range of 0.1 to 0.7%, it can prevent the formation of Bulky IMC, thereby enhancing the adhesion.

The metal pin should desirably have a melting point between 500 to 1000° C. If the range is exceeded, manufacturing costs can increase, and if it is below this range, there is a problem that it can melt during the joining process.

The solder layer is desirably between 0.1 to 10 μm in thickness and is formed by a plating process. If the plating thickness of the solder layer is thicker than 10 μm, during the Reflow process, the solder layer may excessively melt into a liquid state, causing it to flow down from the surface of the metal pin and accumulate around it. This can lead to a decrease in the stability of the metal pin due to the unstable state of the solder layer, and the metal pin can bend or dislodge.

Furthermore, maintaining a plating thickness thicker than 10 μm can increase the risk of void formation. In other words, a thick plating layer can make it easier for the solder paste to trap air when interacting with the metal pin.

If the plating thickness of the solder layer is thinner than 0.1 μm, it may not sufficiently prevent the metal pin from oxidizing, which can degrade its electrical properties. Also, while the solder layer increases surface tension to help the solder paste gather around the metal pin, if the solder layer is too thin, it might not sufficiently experience the effect of surface tension, which can limit the distribution and stability of the solder paste.

On the other hand, when using the solder layer on both ends of the solder pin and making it identical to the composition of the solder paste used to attach the solder pin, for example, SAC305, the composition of the plating layer and the solder paste becomes identical. As a result, there are no interface issues with the solder pin and the solder paste, such as voids, lattice mismatch, reduced wetting, and surface cracks. Moreover, this approach offers the advantage of excellent wetting.

Also, the solder layer melts during the reflow process, generating surface tension that ensures the metal pin is mounted vertically, showing a self-align effect. Therefore, if the plating thickness of the solder layer is thinner than 0.1 μm, there is a higher possibility of additional surface issues and tilt problems.

The plating method of the solder layer can utilize barrel plating or electroless plating, and it undergoes stages of input into the plating solution, plating, and cleaning.

The melting point of the solder layer is desirably between 200 to 250° C. If it exceeds 250° C., there may be issues due to damage to electronic products, and if it's below 200° C., there can be problems with re-melting during product use.

Figure 2:
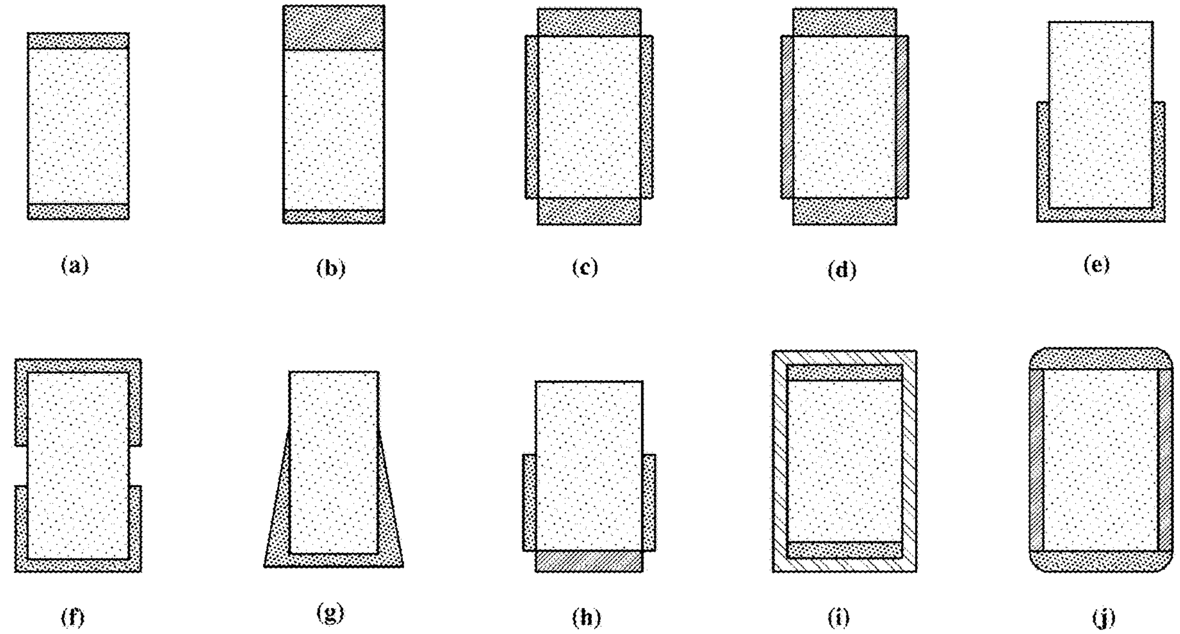
FIG. 2 is a schematic view of various shapes of solder pins according to various embodiments of the present invention.

The solder layer is formed on at least one area of the metal pin and its shape is not limited. FIG. 2 presents various shapes of solder pins according to various embodiments of the invention. Accordingly, depending on its purpose, the solder layer may be formed only on the side, or on the top and bottom, or along the sides of the top and bottom. Even if there is no solder paste on the connection surface in these cases, it is still desirable for the solder layer (20) to be provided on the lower surface of the metal pin (10) even if only flux is applied. This offers advantages in some packaging processes. The thermal conductivity of the solder layer is desirably between 50 to 80 W/mK.

On the other hand, as shown in FIG. 1, a diffusion layer (30) can be provided between the metal pin and the solder layer. The diffusion layer is a plating layer introduced to prevent the diffusion of metal alloy atoms contained in the metal pin and the tin or other metal atom of the solder layer from forming an Intermetallic compound. The diffusion layer includes areas where metal atom contained in the metal column diffuse at high temperatures to form solid solutions. A desirable example of the diffusion layer includes nickel, which has a similar or identical crystalline structure to that of copper as the first metal and has a small difference in atomic size. For example, nickel (Ni), Ni—Ag, Ni—P, Ni—B, Co, and the like can be used.

To improve the electrical conductivity and thermal conductivity of the solder pin, it is desirable to form the plating layer of the diffusion layer in the range of 50~100 W/mK. In this case, Ni—Ag can be used advantageously.

The following explains the manufacturing method of the connection pin according to the invention. The manufacturing method of the connection pin includes the melting step, extrusion and molding step, drawing step, heat treatment step, cutting step, and solder layer forming step.

The melting step is a step in which a specific composition of additive elements is included in the molten metal solution.

The extrusion and molding step is a step in which the molten solution undergoes rolling, pressing, or drawing to produce a strand or a thin sheet.

The drawing step is a step in which the strand or thin sheet is formed into a wire of a specified diameter.

The heat treatment step is a step of heat treatment to secure the strength according to the composition. It is preferable to proceed with heat treatment at a temperature between 160° C. and 300° C. By doing this heat treatment, the Vickers hardness can desirably satisfy a hardness between 150 and 300 HV. If the above hardness is exceeded, cutting can become difficult because the hardness is too high, or it might break. If the hardness is lower than the mentioned range, there can be an increase in the size or quantity of burrs.

The cutting step is a step of cutting the drawn copper wire from the drawing process to a certain length. Here, it's preferable to proceed with a die-cutting method. The die-cutting method utilizes a press process, and by inserting the metal wire at regular intervals into the internal mold of the press and cutting it at a certain length, metal pin are manufactured. As described above, if the metal wire is drawn with the mentioned composition and heat-treated so that the Vickers hardness of the metal wire has a hardness between 150 and 300 HV, and then cut using the die-cutting method, the occurrence of burrs can be minimized.

The solder layer forming step is a step of electroplating a metal, including Sn, on the surface of the metal core to form a plating layer. For electroplating, the metal core is placed in a barrel, with the anode holding the metal intended for plating and the cathode inside the barrel, and electroplating is carried out. During this, the temperature is maintained at 20~30° C. The plating is conducted for an appropriate time depending on the size.

The material of the solder plating solution can be alloys including Sn such as SnAg, SnAgCu, SnCu, SnZn, SnMg, SnAl, etc.

Sn—Ag—Cu can be used advantageously, and in this case, the copper (Cu) content is between 0.2 and 2.0 weight %.

If copper (Cu) is included at less than 0.2 weight %, it is difficult to improve the bond strength or tensile strength of the solder layer as desired. If it exceeds 2.0 weight %, the solder may become hardened, leading to easy structural damage and reducing workability. Preferably, it should be between 0.2 and 1.0 weight %, and even more preferably, 0.5 weight %. The Ag content is desirably between 1.5 and 4.0 weight %.

When silver (Ag) is included at less than 1.5 weight %, it is difficult to sufficiently secure the electrical conductivity and thermal conductivity of the solder layer, and its wettability decreases. If it exceeds 4.0 weight %, the solder alloy and solder layer form a Bulky IMC called Ag3Sn, and due to the excessive growth of the Bulky IMC, there are issues that impair the impact resistance of the solder. The electrolyte used for plating is desirably of the methanesulfonic acid series.

On the other hand, before the solder layer forming process, you can also include a pretreatment process and a diffusion layer forming process.

The pretreatment process includes a degreasing process to remove organic or contaminating materials on the surface of the metal pin and an acid treatment process to remove the oxidation layer on the metal pin surface. If organic materials, contaminants, or oxidation layers exist on the metal pin surface, the plating layer won't form smoothly, making the pretreatment process necessary.

The diffusion layer forming process directly forms a base plating layer on the metal pin surface after the pretreatment process. This prevents oxidation and the associated wetting defects in the copper pad and metal pin and induces the Cu6Sn5 intermetallic compound bonding layer to form a (Cu, Ni) 6Sn5 intermetallic compound, which enhances bond strength and increases reliability.

The diffusion layer formed on the surface of the solder pin is not particularly limited in its composition, but nickel (Ni), Ni—Ag, Ni—P, Ni—B, Co, etc. can be used. Considering thermal conductivity, Ni—Ag is preferable. The diffusion layer can be formed using a widely known electroplating method. If the diffusion layer is formed by electroless plating, there are issues with thickness assurance and reliability.

The thickness of the solder layer varies depending on the diameter of the metal pin and is desirably between 1 to 10 μm, more preferably between 1 to 7 μm, 1 to 5 μm, or 1 to 3 μm. If the solder layer exceeds the aforementioned range, there can be problems during bonding such as tilting, excessive solder leading to bridging, and a decrease in thermal conductivity. On the other hand, if it's below this range, there can be a deficiency in solder, leading to unsatisfactory bonding.

The desirable thickness for the diffusion layer is between 0 to 5 μm. In other words, the diffusion layer can be selectively included, but its inclusion is recommended. When the diffusion layer is included, it can be formed to a thickness of 1 to 5 μm or 1 to 3 μm through electroplating, and it's preferable for the diffusion layer to be thinner than the solder layer. If it deviates from this range, there's a risk of initial crack formation in the bonding layer between the copper pad, metal pin, and solder due to thermal sources (including temperatures around 150° C.) leading to the creation of Kirkendall voids. Furthermore, long-term heat treatment or exposure to thermal cycling/thermal shock can lead to Cu consumption.

It's also possible to form the diffusion layer using electroless plating to a thickness of 0.1 to 1 μm. However, depending on the conditions, there's a risk of initial crack formation due to the creation of Kirkendall voids and the potential for Cu consumption during long-term heat treatment or exposure to thermal cycling/thermal shock.

Moreover, the thermal conductivity of the metal pin is desirably between 50 to 450 W/mK, more preferably between 320 to 450 W/mK. The thermal conductivity of the solder layer is desirably between 50 to 80 W/mK, and that of the diffusion layer is between 50 to 100 W/mK. Particularly for solder pins, which have a small heat transfer cross-sectional area and a long heat transfer thickness, it is desirable to keep the thickness of the lower thermal conductivity solder layer as thin as possible to maintain a high overall thermal conductivity for the solder pin.

Aspect 3: Semiconductor Package and Method of Manufacturing the Semiconductor Package The third aspect of this invention provides a semiconductor package. The structure of this aspect of the semiconductor package includes a first connection surface, a second connection surface, a connection pin, and a solder joint.

The first connection surface and the second connection surface can serve as electrical connection surfaces, such as electrode, pad, terminal, wiring, and bump, depending on various forms of the semiconductor package structure. These connection surfaces may be found in PCBs, interposer, RDLs, flexible substrate, films, or semiconductor chip. the first connection surface and the second connection surface can be of the same type, but they are typically different.

The diameter of the connection pin is between 60 to 500 μm, preferably between 50 to 300 μm, and the height is between 60 to 3,000 μm, preferably between 60 to 1,000 μm.

The connection pin can be composed of the aforementioned metal pin or a solder pin, and the aspect ratio (length/diameter) of the connection pin is preferably between 1 to 10.

The aspect ratio is related to factors such as mechanical stability, adhesive strength, manufacturing process, and heat dissipation. From a mechanical stability perspective, if the aspect ratio is below the aforementioned range, the structural strength might not be sufficient, and it could become sensitive to external shocks or vibrations. Additionally, if it exceeds the range, geometric stability might decrease, leading to issues such as bending or deformation.

From an adhesive strength perspective, if the aspect ratio is smaller than the mentioned range, sufficient adhesive area might not be provided, and if the aspect ratio is large, adhesive strength might decrease, leading to reliability issues in the components.

Furthermore, from a manufacturing process perspective, if the aspect ratio is smaller than the mentioned range, precise control and assembly might be required. On the other hand, if the aspect ratio exceeds the range, efficient control in the manufacturing process might be challenging.

Furthermore, from a thermal management perspective, if the aspect ratio is smaller than the aforementioned range, heat dissipation might not be sufficient. If the aspect ratio exceeds this range, thermal issues might arise due to the limitation of the heat transfer path.

Also, when the connection pin is erected vertically on the first connection surface or the second connection surface, the angle formed by the connection pin and the first connection surface or the second connection surface might not be perpendicular.

In other words, when mounting the connection pin in combination with the solder paste, the connection pin might not align vertically due to reasons mentioned earlier, such as edge R, the angle between vertical and horizontal planes. This misalignment is referred to as Tilting.

The degree of Tilting represents the angular difference between a line connecting the center point of the attached connection pin post-reflow and the connection surface, and the vertical line of the connection surface. If Tilting exceeds a specific range, the component might not function properly. A desirable Tilting angle ($\theta$) is within 4°.

The surface roughness of the connection pin is preferably in the range of RMS 0.5 to 1 μm. If the RMS value of surface roughness is less than 0.5 μm, liquid distribution and adhesion might be insufficient. An overly smooth surface can cause liquids to slide off, reducing stability. This signifies that solder paste might not spread adequately on the pin surface and might adhere insufficiently, leading to weak bonding between the solder paste and the connection pin. This reduced bond can make the component more sensitive to mechanical shocks or temperature changes.

If the RMS value of the surface roughness exceeds 1 μm, liquid distribution might be uneven. When the surface is too rough, solder paste tends to concentrate more on the high points of the surface, leading to uneven liquid distribution. This can cause excessive solder paste accumulation around the Metal pin or result in an uneven coating on the surface.

Additionally, quality issues arising from increased surface tension can occur. A rough surface can increase surface tension and restrict liquid flow. This might hinder the flow of solder paste or pose challenges in forming a stable coating on the surface.

To achieve the surface roughness within the aforementioned range, the conditions of soft etching and plating are appropriately adjusted according to the shape of the metal pin.

The solder joint refers to the portion where the solder paste on the aforementioned first connection surface forms a physical and electrical connection at both ends of the connection pin after reflow, with the first connection surface and the second connection surface. All flux components of this solder paste disappear in the solder joint, leaving only the solder powder that has melted and then reflowed. At this time, the melting rate of the solder powder is over 99%.

The solder joint will have voids after the solder paste undergoes reflow. These voids can vary depending on the amount of solder paste applied and the thickness of its plating. If the plating is too thick, it might run and cause a void in the solder joint. It's desirable that the voids formed in the solder joint of this invention are less than 10%.

Such semiconductor package can be manufactured in various structures.

Figure 3:
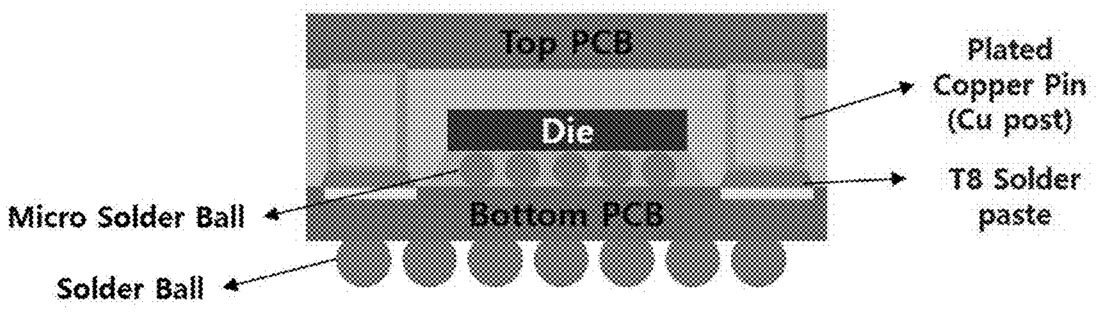
FIGS. 3 to 7 illustrate embodiments of the semiconductor package.

Refer to FIG. 3 for the first embodiment of the semiconductor package. According to this, the semiconductor package includes a first connection body providing a first connection surface, a solder joint, a first connection pin, a semiconductor chip, and a second connection body.

The first connection body is a lower substrate, and the second substrate is an upper substrate. The first connection pin electrically connects the first substrate and the second substrate and has a columnar shape with a solder layer on its exterior. The solder joint connects the first connection surface of the first connection body and the first end portion of the connection pin.

The semiconductor chip is provided on the first side of the first connection body. On the bottom of the semiconductor chip, solder bump are provided, and an underfill is provided between the semiconductor chip and the first connection body.

Figure 4:
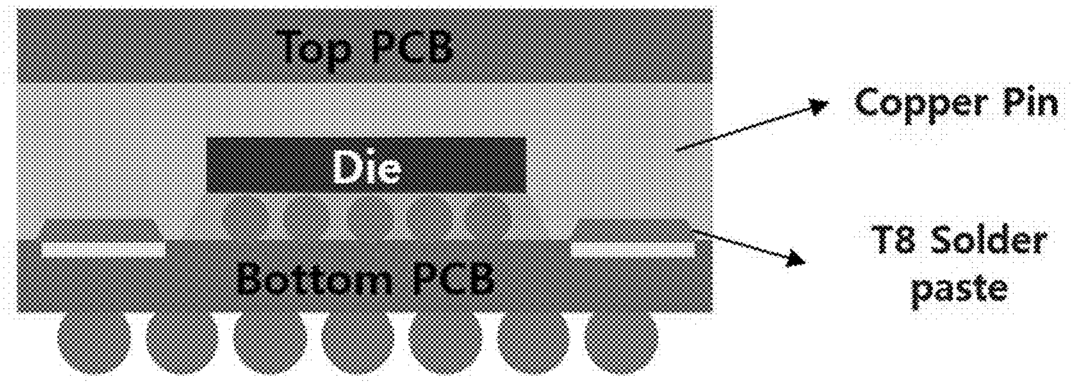

Refer to FIG. 4 for the second embodiment of the semiconductor package. The second embodiment differs from the first embodiment in that it uses a metal pin without a solder layer on the outer surface as the connection pin.

Figure 5:
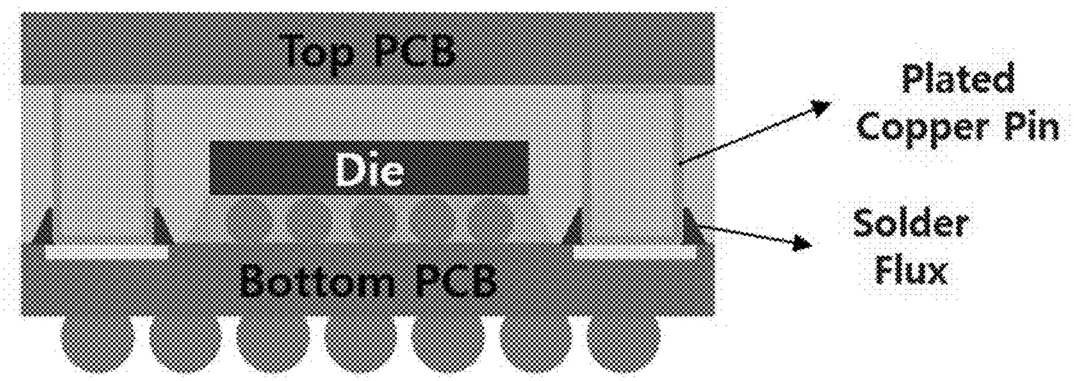

If you refer to FIG. 5 for the third embodiment of the semiconductor package, the third embodiment uses a solder pin with a solder layer on the outer surface as the connection pin. It differs from the first embodiment in that it does not have a solder joint, and only flux is provided around the first end portion of the connection pin and the first connection surface. In this embodiment, it is desirable for the solder layer to be 5-8 μm thick.

Figure 6:
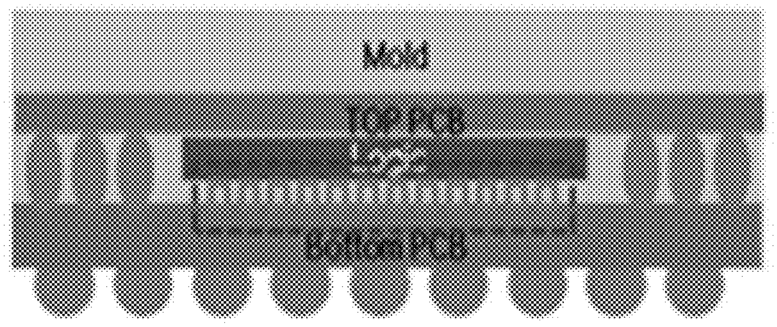

Refer to FIG. 6 for the fourth embodiment of the semiconductor package. While the first to third embodiments have been described with the first connection body and the second connection body each being a lower substrate and an upper substrate respectively, in the fourth embodiment, the first connection body is the lower substrate and the second connection body is the semiconductor chip.

Figure 7:
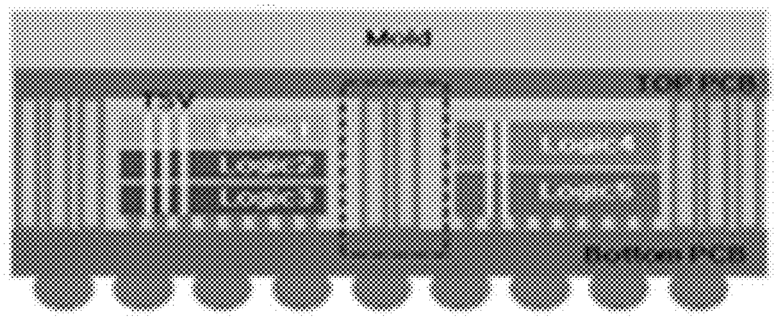

Refer to FIG. 7 for the fifth embodiment of the semiconductor package. The fifth embodiment is distinguished from other embodiments in that it has a structure where two or more semiconductor chip are stacked.

Hereafter, the manufacturing method of the semiconductor package will be described.

The manufacturing method of the semiconductor package includes the first connection surface provision step, the first end portion connection step, the semiconductor chip attachment step, the molding step, the second connection surface provision step, and the second end portion connection step.

The first connection surface provision step is the step of providing the first connection body with the first connection surface.

The first connection surface can be the electrical connection depending on various structures of the semiconductor package, such as an electrode, pad, terminal, wiring, or bump provided on PCB, interposer, RDL, or flexible substrate. Additionally, solder paste or flux can be provided on the first connection surface to join with the first end portion of the connection pin.

The first end portion connection step involves connecting the first end portion of the connection pin to the first connection surface. The solder layer on the connection pin or the solder paste or flux on the first connection surface undergoes reflow and cures, forming a solder joint, attaching the first end portion to the first connection surface.

The semiconductor chip attachment step is where the semiconductor chip is attached to the first connection body. The first side with the terminal of the semiconductor chip can be attached, or its opposite side, the second side, can be attached.

During the molding step, the area around the semiconductor chip is filled with resin to protect it. The connection pin should be exposed from the top surface of the molding to enable electrical connection.

The second connection surface provision step involves introducing the second connection body opposite the first connection body. Similarly, to the first connection surface provision step, the second connection surface can be an electrical connection, based on various structures of the semiconductor package. This could be an electrode, pad, terminal, wiring, or bump on PCB, interposer, RDL, flexible substrate, or film. Additionally, solder paste or flux can be provided on the second connection surface to join with the second end portion of the connection pin.

The second end portion connection step involves connecting the second end portion of the connection pin to the second connection surface. After the solder layer formed on the connection pin or the solder paste or flux provided on the second connection surface undergoes reflow, it cures to form a solder joint, attaching the second end portion to the second connection surface.

Figure 8:
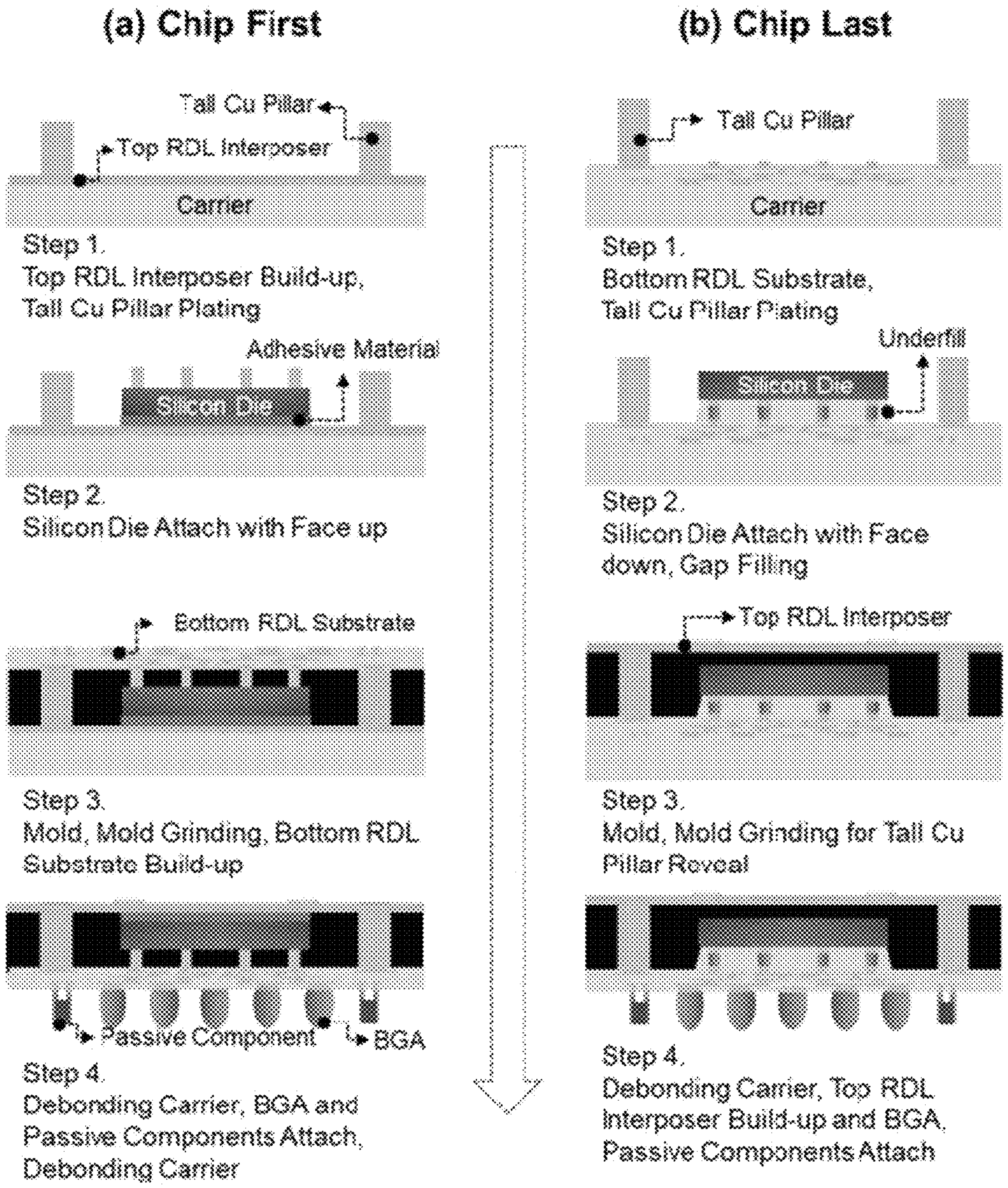
FIG. 8 illustrates the manufacturing methods during the phase where the semiconductor chip is attached. It depicts the method where the terminal formed on the first side of the semiconductor chip bonds with the first connection surface, and the method where the terminal formed on the opposite side bonds with the first connection surface.

FIG. 8 illustrates manufacturing methods in which, during the semiconductor chip attachment step, the first side of the semiconductor chip where the terminal is formed combines with the first connection surface, and methods where the opposite side to the one with the terminal combines with the first connection surface.

Examples 1 to 7

Solder Paste

A solder paste was mixed with D50 particle size of 3.2 μm, where the content of solder powder less than 1 μm is 7 wt % of the total solder powder content, the content of solder powder larger than 8 μm is 0.3 wt %, and the oxygen concentration is 710 ppm of SAC305 solder powder 87.5 g and flux 12.5 g. In this mix, the flux is composed of Tetrakisethylenediamine 35 wt %, 2-Iodobenzoic acid 0.5 wt %, Succinic acid 3 wt %, Propylene Glycol Ether 35 wt %, and α-terpineol 6.5 wt %.

Using the same method as in Example 1, solder pastes for Examples 2 through 7 were produced, and their compositions are shown in Tables 1 and 2.

TABLE 1

| | Example 1 | Example 2 | Example 3 | Example 4 |
|---|---|---|---|---|
| solder powder diameter (based on D50) | 3.2 μm | 3.2 μm | 3.2 μm | 3.2 μm |
| 1 μm less than solder powder content | 7% | 7% | 7% | 7% |
| 8 μm or larger solder powder content | 0.3% | 0.3% | 0.3% | 0.3% |
| Oxygen concentration | 710 ppm | 710 ppm | 710 ppm | 710 ppm |
| Flux content | 12.5% | 15% | 17% | 19% |
| Active agent (based on 100 wt % flux) | 2-Iodo-benzoic acid 0.5% (based on 100 wt % flux) | 2-Iodo-benzoic acid 0.5% (based on 100 wt % flux) | 2-Iodo-benzoic acid 0.5% (based on 100 wt % flux) | 2-Iodo-benzoic acid 0.5% (based on 100 wt % flux) |
| Organic acid content (based on 100 wt % flux) | Succinic acid 3% | Succinic acid 3% | Succinic acid 3% | Succinic acid 3% |
| surfactant (based on 100 wt% flux) | Propylene Glycol Ether 35% | Propylene Glycol Ether 35% | Propylene Glycol Ether 35% | Propylene Glycol Ether 35% |
| amine-based active agent (based on 100 wt % flux) | Tetrakis-ethylene-diamine 35 wt % | Tetrakis-ethylene-diamine 35 wt % | Tetrakis-ethylene-diamine 35 wt % | Tetrakis-ethylene-diamine 35 wt % |
| solvent (based on 100 wt % flux) | α-terpineol 6.5 wt % | α-terpineol 6.5 wt % | α-terpineol 6.5 wt % | α-terpineol 6.5 wt % |

TABLE 2

| | Example 5 | Example 6 | Example 7 |
|---|---|---|---|
| solder powder diameter (based on D50) | 3.2 μm | 3.2 μm | 3.2 μm |
| 1 μm less than solder powder content | 7% | 7% | 7% |
| 8μm or larger solder powder content | 0.3% | 0.3% | 0.3% |
| Oxygen concentration | 710 ppm | 710 ppm | 710 ppm |
| Flux content | 17% | 17% | 19% |
| Active agent (based on 100 wt % flux) | Cetyltri-methyl-ammonium bromide 0.5% | Cetyltri-methyl-ammonium bromide 0.5% | Cetyltri-methyl-ammonium bromide 0.5% |
| Organic acid content (based on 100 wt % flux) | Succinic acid 3% | Glutaric acid 3% | Succinic acid 6% |
| surfactant (based on 100 wt % flux) | Propylene Glycol Ether 35% | Propylene Glycol Ether 35% | Propylene Glycol Ether 35% |
| amine-based active agent (based on 100 wt % flux) | Tetrakis-ethylene-diamine 35 wt % | Tetrakis-ethylene-diamine 35 wt % | Tetrakis-ethylene-diamine 35 wt % |
| solvent (based on 100 wt % flux) | α-terpineol 6.5 wt % | α-terpineol 6.5 wt % | α-terpineol 6.5 wt % |

Using the same method as in Example 1, solder pastes for Comparative Examples 1 through 7 were produced, and their compositions are shown in Tables 3 and 4.

TABLE 3

| | Comparative Example 1 | Comparative Example 2 | Comparative Example 3 | Comparative Example 4 |
|---|---|---|---|---|
| solder powder diameter (based on D50) | 3.2 μm | 3.2 μm | 6 μm | 3.2 μm |
| 1 μm less than solder powder content | 7% | 7% | 0% | 11% |
| 8μm or larger solder powder content | 0.3% | 0.3% | 20% | 0.3% |

TABLE 3-continued

| | Comparative Example 1 | Comparative Example 2 | Comparative Example 3 | Comparative Example 4 |
|---|---|---|---|---|
| Oxygen concentration | 710 ppm | 710 ppm | 400 ppm | 710 ppm |
| Flux content | 9% | 21% | 17% | 17% |
| Active agent (based on 100 wt % flux) | 2-Iodo benzoic acid 0.5% | 2-Iodo benzoic acid 0.5% | 2-Iodo benzoic acid 0.5% | Cetyltrimethyl-ammonium bromide 0.5% |
| Organic acid content (based on 100 wt % flux) | Succinic acid 3% | Succinic acid 3% | Succinic acid 3% | Succinic acid 6% |
| surfactant (based on 100 wt % flux) | Propylene Glycol Ether 35% | Propylene Glycol Ether 35% | Propylene Glycol Ether 35% | Propylene Glycol Ether 35% |
| amine-based active agent (based on 100 wt % flux) | Tetrakis-ethylene-diamine 35 wt % | Tetrakis-ethylene-diamine 35 wt % | Tetrakis-ethylene-diamine 35 wt % | Tetrakis-ethylene-diamine 35 wt % |
| solvent (based on 100 wt % flux) | α-terpineol 6.5 wt % | α-terpineol 6.5 wt % | α-terpineol 6.5 wt % | α-terpineol 6.5 wt % |

TABLE 4

| | Comparative Example 5 | Comparative Example 6 (Differentiated from Example 9, there's a lot of tilt due to the non-melting property.) | Comparative Example 7 (Differentiated from Example 10, there's a lot of tilt due to the non-melting property.) | Comparative Example 7-1 (Differentiated from Example 7, surfactant is not used.) | Comparative Example 7-2 (Differentiated from Example 7, halogen is not used.) | Comparative Example 7-3 (Differentiated from Example 7, amine-based active agent is not used) |
|---|---|---|---|---|---|---|
| solder powder diameter (based on D50) | 3.2 μm | 3.2 μm | 3.2 μm | 3.2 μm | 3.2 μm | 3.2 μm |
| 1 μm less than solder powder content | 7% | 7% | 7% | 7% | 7% | 7% |
| 8 μm or larger solder powder content | 1.3% | 0.3% | 0.3% | 0.3% | 0.3% | 0.3% |
| Oxygen concentration | 1170 ppm | 950 ppm | 883 ppm | 883 ppm | 883 ppm | 883 ppm |
| Flux content | 17% | 17% | 17% | 17% | 17% | 17% |
| Active agent (based on 100 wt % flux) | 2-Iodoben zoic acid 0.5% | 2-Iodoben zoic acid 0.5% | 2-Iodoben zoic acid 0.5% | 2-Iodoben zoic acid 0.5% | — | 2-Iodoben zoic acid 0.5% |
| Organic acid (based on 100 wt % flux) | Succinic acid 3% | Succinic acid 3% | acid 3% | acid 3% | Succinic acid 3% | Succinic acid 3% |
| surfactant (based on 100 wt % flux) | Propylene Glycol Ether 35% | Propylene Glycol Ether 35% | Propylene Glycol Ether 35% | — | Propylene Glycol Ether 35% | Propylene Glycol Ether 35% |
| amine-based active agent (based on 100 wt % flux) | Tetrakis-ethylene-diamine 35 wt % | Tetrakis-ethylene-diamine 35 wt % | Tetrakis-ethylene-diamine 35 wt % | Tetrakis-ethylene-diamine 35 wt % | Tetrakis-ethylene-diamine 35 wt % | — |
| solvent (based on 100 wt % flux) | α-terpineol 6.5 wt % | α-terpineol 6.5 wt % | α-terpineol 6.5 wt % | α-terpineol 6.5 wt % | α-terpineol 6.5 wt % | α-terpineol 6.5 wt % |

Example 8 to Example 10

Comparative Example 5 to 11

Solder Pin

The entire surface of the metal pin was coated with a solder layer composed of Sn—Ag—Cu. First, a copper alloy pin was acid-cleaned, then placed inside a barrel. Sn—Ag was hung at the anode, and MS-Cu plating solution and additive were added to the plating solution. Electroplating was carried out on the copper alloy pin by hanging it at the cathode.

During this time, the temperature was maintained between 20~30° C. Electroplating was conducted at a current density of 1 A/dm for 30 minutes to 3 hours to form a first solder layer with a thickness of approximately 1~6 μm. Solder pins of various sizes, roughness, and edge R values were manufactured and summarized in Table 5.

TABLE 5

| | Example 8 | Example 9 | Comparative Example 5 | Comparative Example 6 | Comparative Example 7 | Comparative Example 8 | Example 10 | Comparative Example 9 | Comparative Example 10 | Comparative Example 11 |
|---|---|---|---|---|---|---|---|---|---|---|
| Cu pin Diameter | 120 µm | 120 µm | 120 µm | 120 µm | 120 µm | 120 µm | 120 µm | 120 µm | 50 µm | 120 µm |
| Cu pin Length | 180 µm | 300 µm | 180 µm | 300 µm | 180 µm | 300 µm | 300 µm | 180 µm | 600 µm | 180 µm |
| solder powder Diameter | | | | | 3.2 µm | | | | | 6 µm |
| Cu pin Aspect ratio | 1.8 | 2.5 | 1.8 | 2.5 | 1.8 | 2.5 | 2.5 | 1.8 | 12 | 1.8 |
| Cu pin Angle between horizontal and vertical planes | 90° | 90° | 86° | 90° | 90° | 90° | 90° | 90° | 90° | 90° |
| Cu pin surface roughness | RMS 0.7 µm | RMS 0.7 µm | RMS 0.7 µm | RMS 3 µm | RMS 0.9 µm | RMS 0.7 µm | RMS 0.7 µm | RMS 3 0.7 µm | RMS 0.6 µm | RMS 0.7 µm |
| Cu pin Plating material | SAC305, thickness 1 µm | SAC305, thickness 1 µm | SAC305, thickness 1 µm | SAC305, thickness 1 µm | SAC305, thickness 6 µm | SAC305, thickness 1 µm | — | — | — | — |
| Cu pin edge R value | 9 µm | 7 µm | 15 µm | 7 µm | 8 µm | 2 µm | 7 µm | 2 µm | 3 µm | 2 µm |

Example 11

Metal Pin

A copper alloy wire was prepared by mixing Sn in a copper melt at 5.0%. Next, these copper alloy wires were passed through a die to expand the diameter q of the top and bottom surfaces to 120 µm. After that, the copper alloy wire was cut at positions with lengths (height L) of 180 µm and 300 µm, thereby fabricating the desired copper alloy pin. The cutting was done using a die-cutting method.

Subsequently, the copper alloy pin was annealed. For the annealing conditions, the time to heat from room temperature to 200° C. was set to 20 minutes, the holding time at 200° C. was set to 180 minutes, and the cooling time from 200° C. to room temperature was set to 20 minutes. Cooling inside the furnace was carried out using a cooling fan installed inside the furnace.

Experimental Example 1

Viscosity, Thixotropy, Tackiness

The viscosity and tackiness of the solder paste from Example 1 to 7 and Comparative Example 1 to 7 were measured and summarized in Tables 6, 7, and 8.

Viscosity and thixotropy were measured using a Rheometer.

Viscosity was measured at a 10 RPM value, and thixotropy was measured by taking the logarithm of the value obtained by dividing 3 RPM by 30 RPM. (Thixotropy=log (3 rpm/30 rpm))

Tackiness was measured using a Tackiness tester (TK-1) from Malcom社.. It measures the force when a probe touches the center of the printed solder paste and then drops away. If the rate of change exceeds 30% after 4 hours, it is judged that there is a possibility of product aging changes.

TABLE 6

| Standard | | Example 1 | Example 2 | Example 3 | Example 4 |
|---|---|---|---|---|---|
| Viscosity & Thixotropic Index | Viscosity: 10 rpm/ T.I: log(3rpm/ 30 rpm) | 156/0.78 | 101/0.74 | 73.9/0.73 | 66.9/0.74 |
| Tackiness | 100 gf or more (change rate within 30% in 4 hours) | initial: 188.28 4 hr later: 221.60 (change rate 17.7%) | initial: 165.2 in 4 hr later: 185.51 (change rate 12.3%) | initial: 143.46 4 hr later: 181.46 (change rate 26.5%) | initial: 123.04 4 hr later: 148.98 (change rate 21%) |

TABLE 7

| Standard | | Example 5 | Example 6 | Example 7 |
|---|---|---|---|---|
| Viscosity & Thixotropic Index | Viscosity: 10 rpm/ T.I: log(3 rpm/ 30 rpm) | 65/0.81 | 56/0.81 | 60/0.80 |

TABLE 7-continued

| | Standard | Example 5 | Example 6 | Example 7 |
|---|---|---|---|---|
| Tackiness | 100 gf or more (change rate within 30% in 4 hours) | initial: 139.25 4 hr later: 154.45 (change rate 10.9%) | initial: 142.84 4 hr later: 156.47 (change rate 9.5%) | initial: 142.92 4 hr later: 144.64 (change rate 1.2%) |

TABLE 8

| | | Comparative Example 1 | Comparative Example 2 | Comparative Example 3 | Comparative Example 4 | Comparative Example 5 | Comparative Example 6 | Comparative Example 7 | Comparative Example 7-1 | Comparative Example 7-2 | Comparative Example 7-3 |
|---|---|---|---|---|---|---|---|---|---|---|---|
| Viscosity & Thixotropic Index | Viscosity: 10 rpm/ T.I : log(3 rpm/ 30 rpm) | 197/ 0.84 | 40/ 0.75 | 56/ 0.81 | 83/ 0.71 | 75/ 0.74 | 72/ 0.73 | 77/ 0.73 | 35/ 0.60 | 75/ 0.72 | 30/ 0.58 |
| Tackiness | 100 gf or more (change rate within 30% in 4 hours) | initial: 120.80 4 hr later: 149.1 (change rate 23.4%) | initial: 17055 4 hr later: 175.9 (change rate 3.1%) | initial: 142.84 4 hr later: 156.47 (change rate 9.5%) | initial: 145.10 4 hr later: 152.57 (change rate 5.1%) | initial: 144.42 4 hr later: 165.9 (change rate 14.9%) | initial: 147.75 4 hr later: 162.19 (change rate 9.8%) | initial: 150.12 4 hr later: 162.9 (change rate 8.5)% | initial: 111.51 4 hr later: 132.33 (change rate 18.7%) | initial: 140.59 4 hr later: 149.49 (change rate 6.3%) | initial: 103.71 4 hr later: 105.99 (change rate 2.2%) |

Experimental Example 2

Solderability

Figure 21:
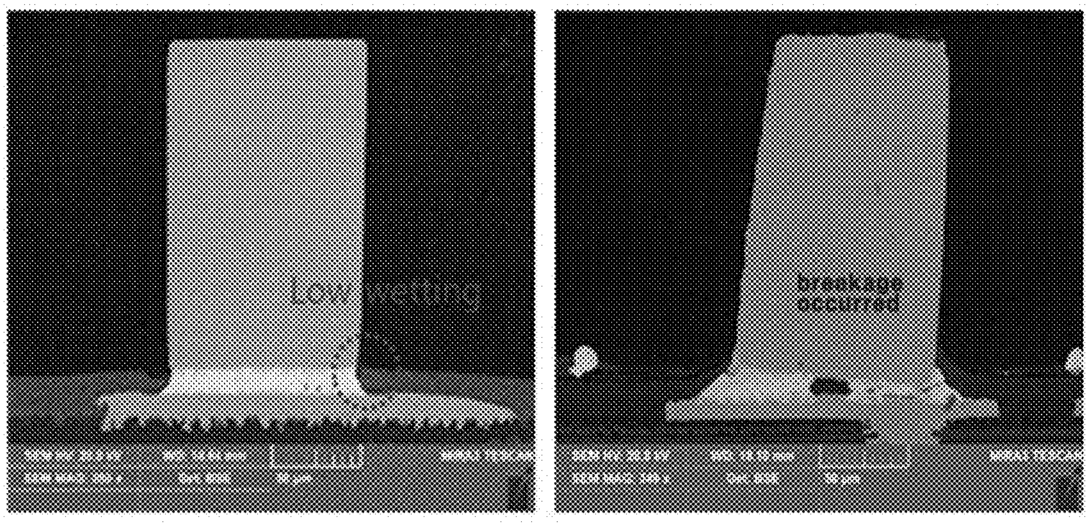
FIG. 21 is a photograph verifying the missing in Comparative Example 8 where no plating layer is formed on the exterior of the metal pin.
Figure 21:
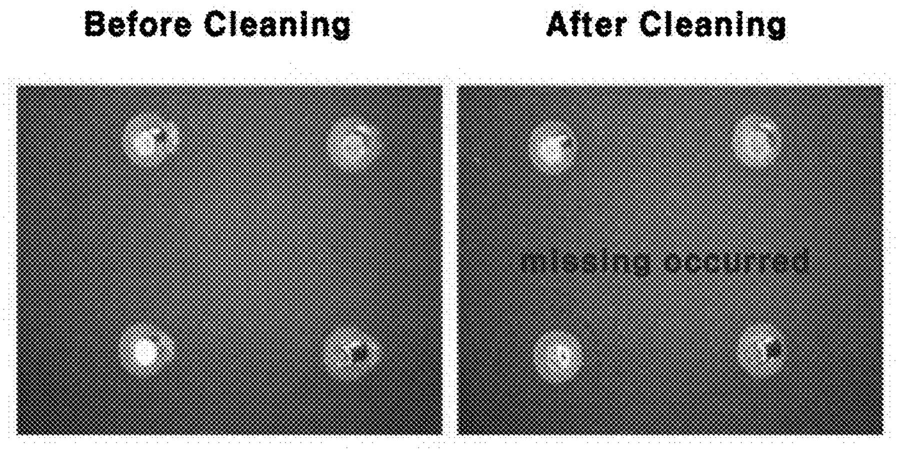

Solderability is evaluated based on internal limit samples and is observed under a microscope after melting to assign scores ranging from 1 to 5 based on the solder shape. Examples 1 to 7 and Comparative Examples 1 to 7 were evaluated according to the following criteria: (1 point indicates no melting at all, 2 points indicate insufficient melting characteristics to the extent that powder is visible, 3 points indicate melting occurred but partial cold soldering phenomenon is observed, 4 points mean good melting but surface roughness is somewhat uneven, 5 points indicate complete melting with an excellent surface condition). To objectify the evaluation scores, FIG. 21 presents standardized images. The results of solderability are summarized in Tables 9, 10, and 11.

TABLE 9

| | Standard | Example 1 | Example 2 | Example 3 | Example 4 |
|---|---|---|---|---|---|
| Solderability | 1~5 point (According to internal standards) | 4 | 4 | 4 | 3 |

TABLE 10

| | Standard | Example 5 | Example 6 | Example 7 |
|---|---|---|---|---|
| Solderability | 1~5 point (According to internal standards)) | 4 | 4 | 4 |

TABLE 11

| | | Comparative Example 1 | Comparative Example 2 | Comparative Example 3 | Comparative Example 4 | Comparative Example 5 | Comparative Example 6 | Comparative Example 7 | Comparative Example 7-1 | Comparative Example 7-2 | Comparative Example 7-3 |
|---|---|---|---|---|---|---|---|---|---|---|---|
| Solder ability | 1~5 point (According to internal standards)) | 3 | 4 | 4 | 3.5 | 1 | 3 | 3.5 | 4 | 2 | 2 |

Examples 1 to 7 had low solderability, and Comparative Examples 1 to 7 also had low solderability.

Experimental Example 3

Measurement of Tilting Degree and Missing Rate

Using a connection pin with a diameter of 120 μm, length of 300 μm, aspect ratio of 2.5, and solder layer thickness of 1 μm on a PCB with an area of 50 mm*40 mm where an 18 μm thick Cu pad was plated, the electrode and connection pin were attached. After reflowing the solder paste of Examples 1 to 7 and Comparative Examples 1 to 5 and then curing, the degree of tilting and missing rate of the connection pin were measured.

Figure 9:
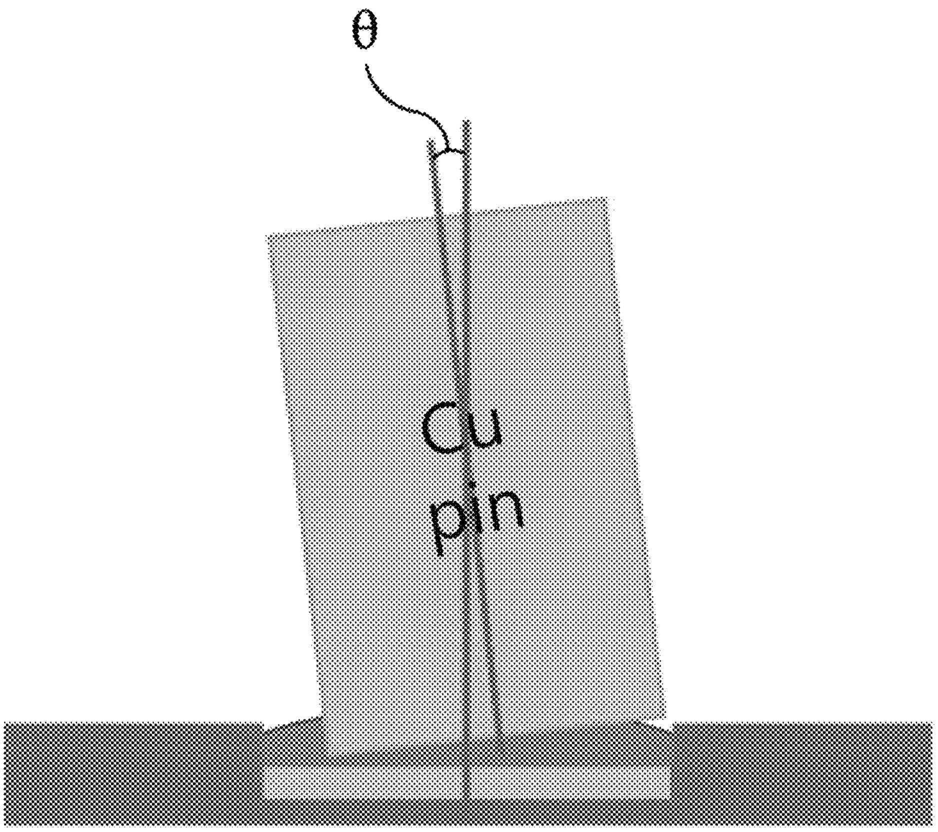
FIG. 9 is a diagram explaining the tilting degree of the connection pin.

The degree of tilting was indicated by the maximum difference in angle formed between a line connecting the center point of a randomly attached connection pin to the connection surface and the vertical line of the connection surface, as shown in FIG. 9. Missing was represented as a percentage, measuring the ratio of connection pin that were detached before and after the reflow process. These results were summarized in Tables 12 and 13.

TABLE 12

| | | Example 1 | Example 2 | Example 3 | Example 4 | Example 5 | Example 6 | Example 7 |
|---|---|---|---|---|---|---|---|---|
| Tilt | Cu pad mounting standard | 5° | 3° | 1° | 1° | 1° | 1° | 1° |
| Missing | Cu pad mounting standard | 0% | 0% | 1.3% | 3% | 1.1% | 0.3% | 0% |

TABLE 13

| | | Comparative Example 1 | Comparative Example 2 | Comparative Example 3 | Comparative Example 4 | Comparative Example 5 |
|---|---|---|---|---|---|---|
| Tilt | Cu pad mounting standard | 7° | 3° | 7° | 3° | 6° |
| Missing | Cu pad mounting standard | 38% (Defect in mounting due to non-melting) | 19% (Adhesion weakness due to voids) | 34% (High amount of coarse particles) | 17% (High amount of fine particles, defect in mounting due to non-melting) | 31% (Defect in mounting due to non-melting) |

Figure 10:
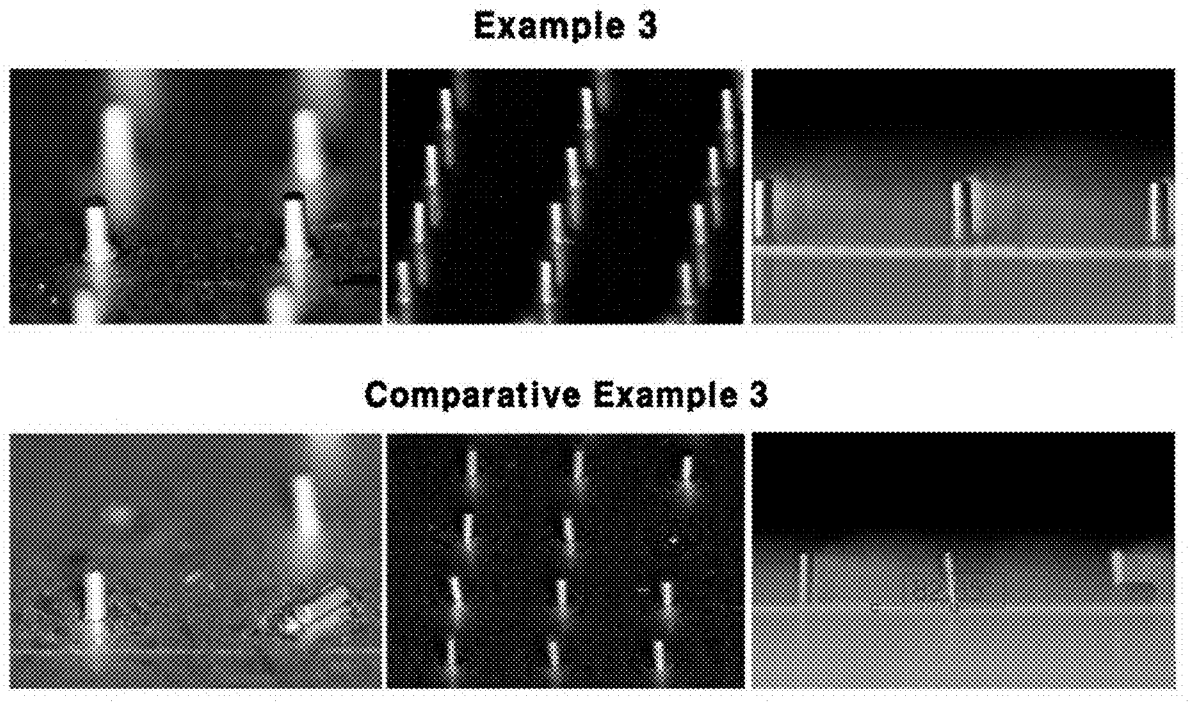
FIG. 10 is a photograph showing the tilting and missing of Example 3 and Comparative Example 3.

Meanwhile, FIG. 10 shows photographs illustrating the degree of tilting and missing for Example 3 and Comparative Example 3.

Experimental Example 4

Particle Size Distribution of Solder Powder

Figure 11:
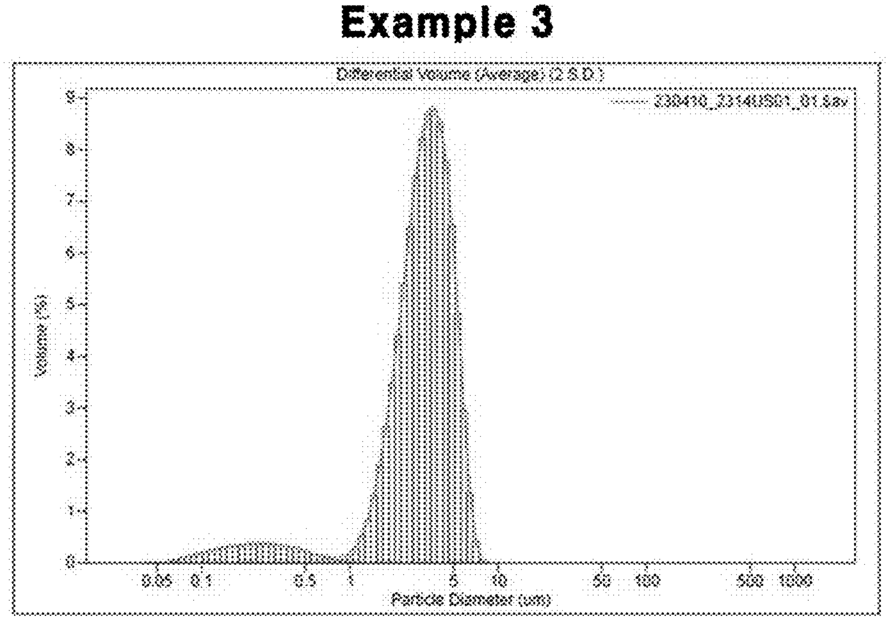
FIGS. 11 and 12 are graphs showing the particle size distribution of the solder powder used in Example 3 and Comparative Example 3.
Figure 12:
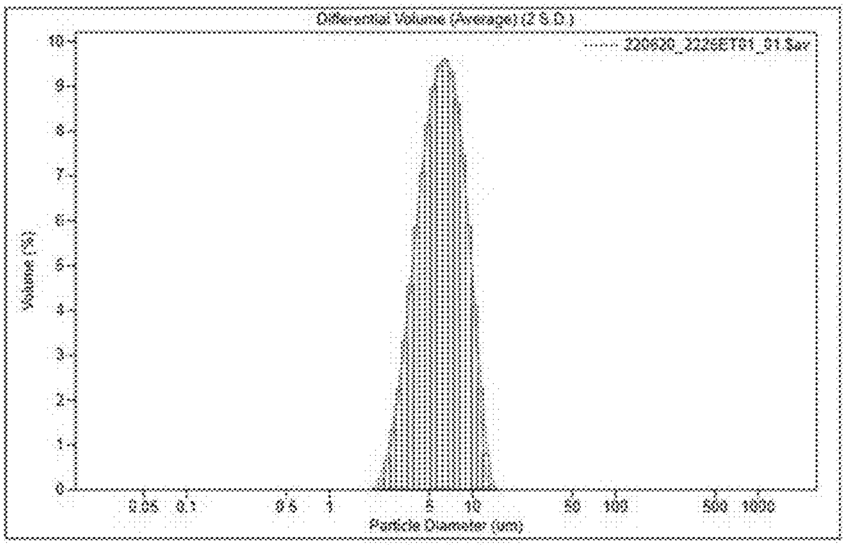

FIGS. 11 and 12 display the particle size distribution graphs of the solder powder used in Example 3 and Comparative Example 3. According to this, in Example 3, D50 is 3.227, particles less than 1 μm account for 6.99%, and particles exceeding 8 μm are less than 0.3%.

Experimental Example 4

Electron Microscope Photographs

Figure 13:
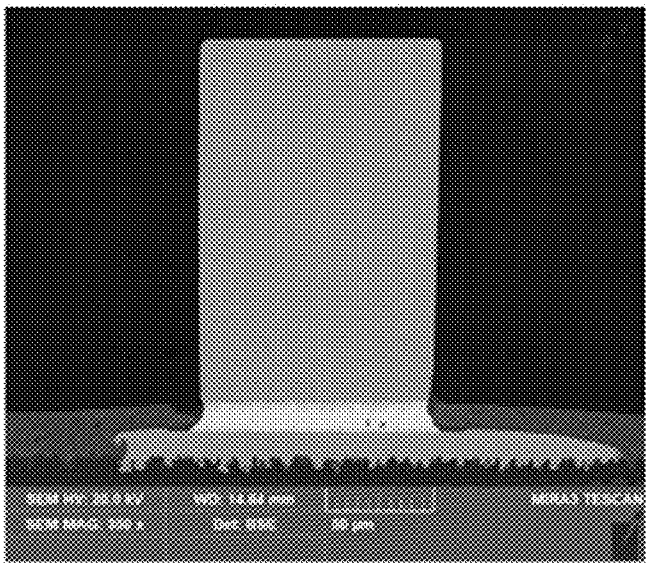
FIG. 13 is an electron microscope photograph taken after connecting the connection pin to the connection surface using solder paste from Example 3 and Comparative Example 3.
Figure 13:
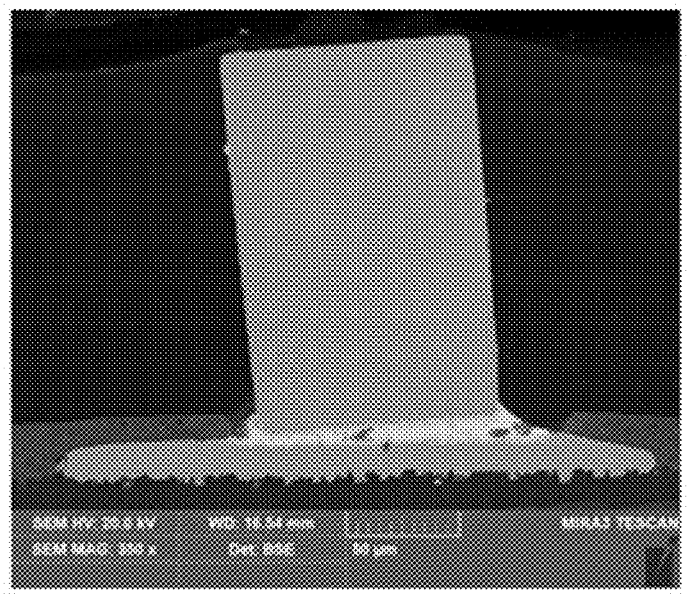
Figure 14:
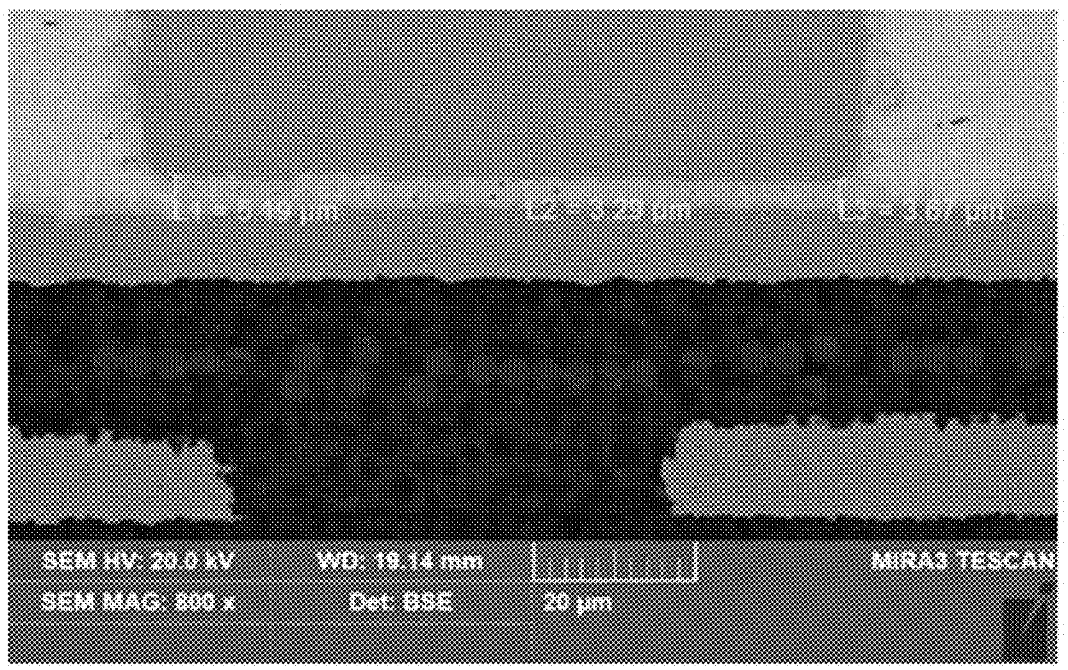
FIG. 14 is an electron microscope photograph measuring the thickness of the solder joint between the connection pin and the connection surface by performing a 3-point measurement.
Figure 15:
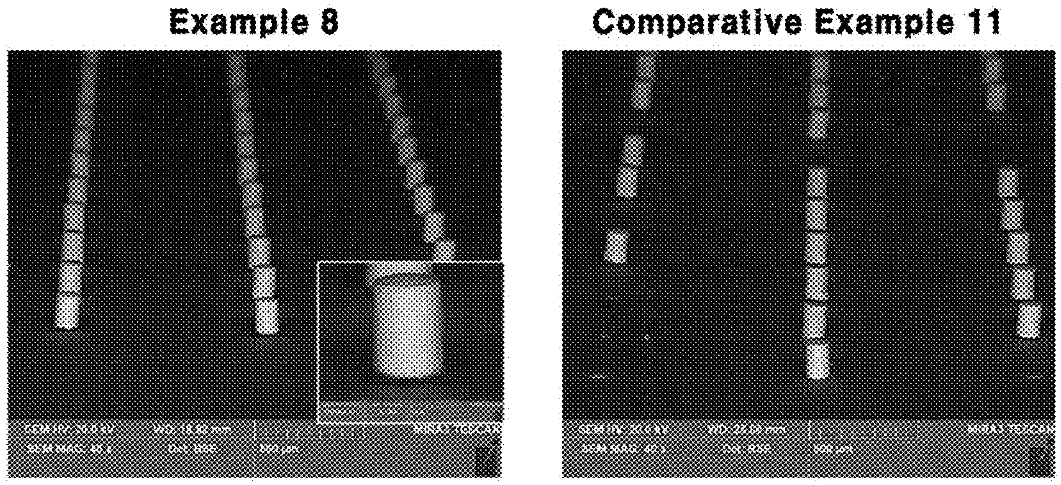
FIG. 15 is a photograph verifying the tilting angle and missing rate of Example 8 and Comparative Example 11.
Figure 16:
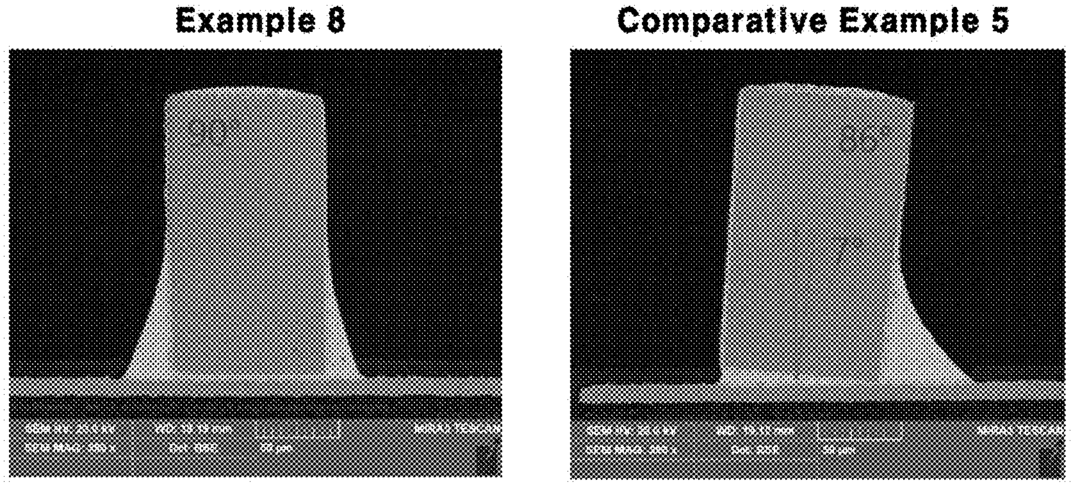
FIG. 16 is a photograph verifying the tilting angle and missing rate of Example 8 and Comparative Example 5.
Figure 17:
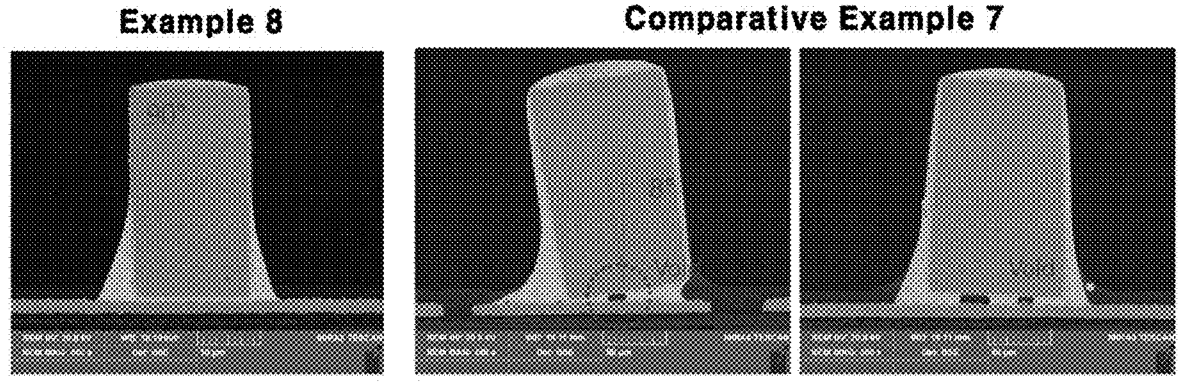
FIG. 17 is a photograph verifying the tilting angle and void of Example 8 and Comparative Example 7.
Figure 18:
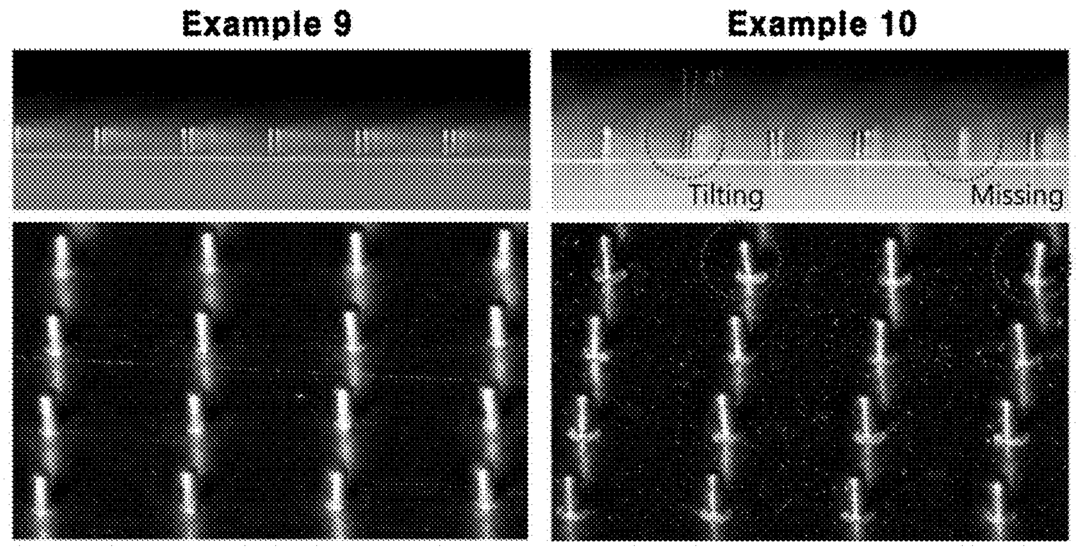
FIG. 18 is a photograph showing the tilting angle and missing rate due to the formation of the solder layer in Example 9 and Example 10.
Figure 19:
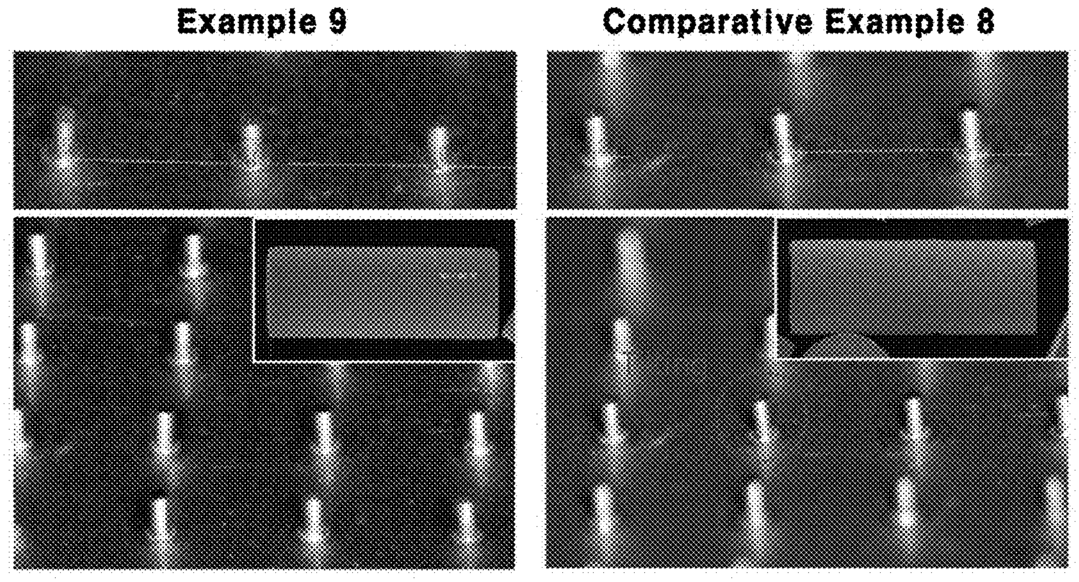
FIG. 19 is a photograph showing the tilting angle due to the difference in edge R between Example 9 and Comparative Example 8.

Using the solder paste of Example 3 and Comparative Example 3 of the present invention, the connection pin was connected to the connection surface, and images were taken with an electron microscope and presented in FIG. 13. Additionally, measurements were conducted at three points to gauge the thickness of the solder joint between the connection pin and the connection surface, and these findings were depicted in FIG. 14. Based on this, it was observed that the solder joint thickness between the connection pin and the connection surface was consistent.

Experimental Example 5

Degree of Tilting, Void, Missing Rate, and Wetting

The degree of tilting, void, missing rate, and wetting of Examples 8 and 9, as well as Comparative Examples 5 to 11, were measured and summarized in Table 14. For this experiment, the solder paste from Example 5 was utilized.

TABLE 14

| | Example 8 | Example 9 | Comparative Example 5 | Comparative Example 6 | Comparative Example 7 | Comparative Example 8 | Example 10 | Comparative Example 9 | Comparative Example 10 | Comparative Example 11 |
|---|---|---|---|---|---|---|---|---|---|---|
| Tilting | 2° | 2° | 7° | 3° | 8° | 9° | 4° | 2° | 30° | 7° |
| Void | 4% | 5% | 5% | 14% | 20% | 20% | 3% | 2% | 5% | 3% |
| Missing | 0% | 0% | 2% | 3% | 0% | 0% | 5% | 13% | 0% | 63% |
| Wetting | 10 μm | 10 μm | 10 μm | 10 μm | 25 μm | 5 μm | 5 μm | 1 μm | 2 μm | 2 μm |

Figure 20:
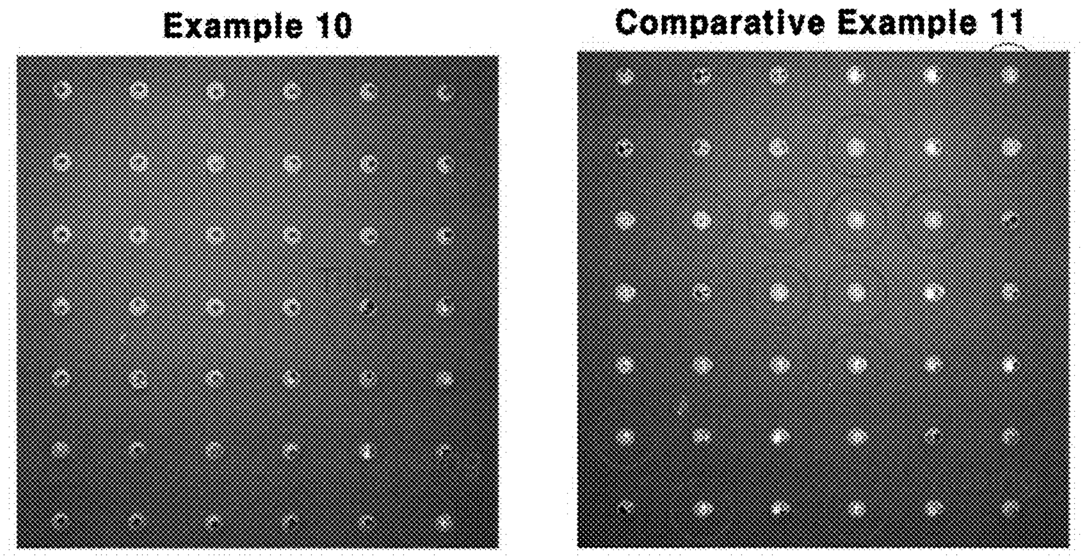
FIG. 20 is a photograph showing the difference in tilting angle and missing rate based on the edge R value between Example 10 and Comparative Example 11.

FIG. 20 is a photo showing the difference in tilting angle and missing rate according to the edge R value in Example 10 and Comparative Example 11.

FIG. 21 is a photo for checking the missing in Comparative Example 8 where the plating layer is not formed on the outer surface of the metal pin.

Figure 22:
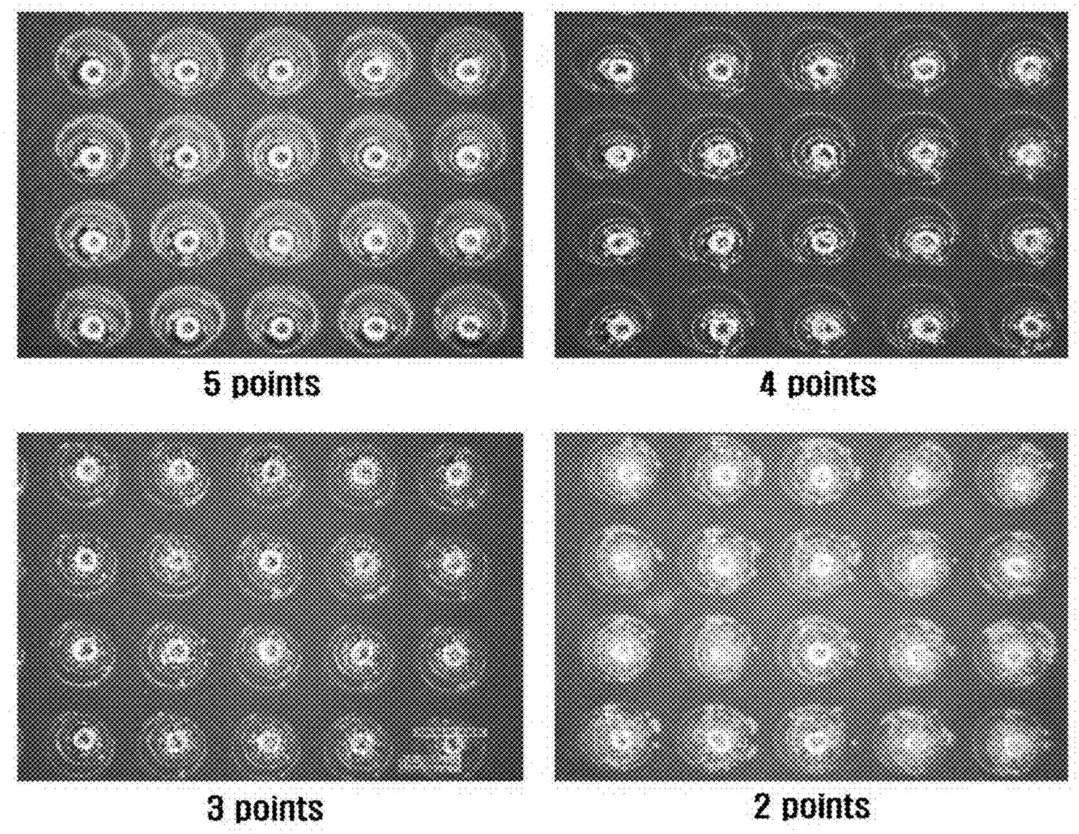
FIG. 22 is a photograph for evaluation.

FIG. 22 illustrates a photo that serves as a criterion for setting standards in the evaluation of solderability during internal evaluation.

The features, structures, and effects exemplified in the aforementioned embodiments can be combined or modified for implementation by those with ordinary skill in the art to which these embodiments pertain. Therefore, such combinations and modifications should be interpreted as being within the scope of the present invention.

The invention claimed is:

1. A connection pin for electrically connecting between connection surfaces inside a semiconductor package, comprising a columnar structure consisting of a metal pin, or a solder pin having a solder layer formed on at least one region of an exterior surface of said metal pin, wherein said columnar structure has:

a diameter ranging from about 60 μm to about 500 μm, an aspect ratio (length to diameter) ranging from about 1 to about 10, and a horizontal surface and a vertical surface of said structure defining an angle ranging from about 87° to about 93°, and wherein said metal pin has an edge R value ranging from about 3 μm to about 20 μm.

2. The connection pin of claim 1, wherein said connection pin is comprised of a metal or an alloy, and said connection pin includes said metal pin having an electrical conductivity ranging from about 11% IACS to about 101% IACS.

3. The connection pin of claim 2, wherein said metal pin has a melting point ranging from about 500° C. to about 1000° C.

4. The connection pin of claim 2, wherein said connection pin has a surface roughness ranging from about RMS 0.5 μm to about RMS 1 μm.

5. The connection pin of claim 1, further comprising a solder layer on at least one region of the surface of said metal pin, wherein said solder layer comprises tin.

6. The connection pin of claim 5, wherein said solder layer further comprises silver, and wherein the content of said silver is ranging from about 1.5 weight % to about 4.0 weight %.

7. The connection pin of claim 6, wherein said solder layer has a thickness ranging from about 0.1 μm to about 10 μm.

8. The connection pin of claim 6, wherein said solder layer is plated on the exterior surface of said metal pin.

9. The connection pin of claim 6, further comprising a diffusion layer between said metal pin and said solder layer, wherein said diffusion layer is introduced to prevent the formation of intermetallic compounds by diffusion between metal alloy atoms included in said metal pin and metal atoms of said solder layer.

10. The connection pin of claim 9, wherein said diffusion layer has a thickness ranging from about 1 μm to about 5 μm.

* * * * *